(12) United States Patent
Ziegler

(10) Patent No.: US 11,980,979 B2
(45) Date of Patent: May 14, 2024

(54) ARTICLE SELECTION AND PLACEMENT ASSEMBLY

(71) Applicant: Graphic Packaging International, LLC, Atlanta, GA (US)

(72) Inventor: Kelly Ziegler, Crosby, MN (US)

(73) Assignee: Graphic Packaging International, LLC, Atlanta, GA (US)

( * ) Notice: Subject to any disclaimer, the term of this patent is extended or adjusted under 35 U.S.C. 154(b) by 0 days.

(21) Appl. No.: 18/200,661

(22) Filed: May 23, 2023

(65) Prior Publication Data
US 2023/0294222 A1    Sep. 21, 2023

Related U.S. Application Data

(62) Division of application No. 17/238,405, filed on Apr. 23, 2021, now Pat. No. 11,691,232, which is a
(Continued)

(51) Int. Cl.
*B23P 19/00* (2006.01)
*B65C 7/00* (2006.01)
(Continued)

(52) U.S. Cl.
CPC .............. *B23P 19/001* (2013.01); *B65C 7/00* (2013.01); *B65H 19/10* (2013.01); *B65H 19/22* (2013.01);
(Continued)

(58) Field of Classification Search
CPC ......... B23P 19/001; B65C 7/00; B65H 20/22; B65H 2701/1942; Y10T 29/49826;
(Continued)

(56) References Cited

U.S. PATENT DOCUMENTS 1,225,090 A * 5/1917 Whatley .................. B65C 7/00
493/375
2,535,473 A   12/1950 Wolford
(Continued)

FOREIGN PATENT DOCUMENTS

DE    42 09 671 C1    9/1993
EP    0 761 538 A1    3/1997
(Continued)

OTHER PUBLICATIONS

International Search Report and Written Opinion for PCT/US2010/037956, dated Feb. 28, 2011.
(Continued)

*Primary Examiner* — Sarang Afzali
*Assistant Examiner* — Darrell C Ford
(74) *Attorney, Agent, or Firm* — Womble Bond Dickinson (US) LLP

(57) ABSTRACT

An apparatus is disclosed for applying tags with attached elastic anchor bands onto the tops of objects such as bottles in a high speed packaging application. The apparatus includes an infeed assembly for feeding a web, a conveyor assembly that receives a web and conveys it along a path in an upstream direction, a rotating selector wheel, a placement assembly, a pair of rotating jaw assembles, a vacuum cup of the selector wheel, and stretched elastic bands over the tops of respective bottles being conveyed along a path below the placing assembly. The elastic bands then snap onto the tops of their respective bottles to secure the tags to the bottles.

6 Claims, 26 Drawing Sheets

Related U.S. Application Data division of application No. 16/279,292, filed on Feb. 19, 2019, now Pat. No. 11,014,204, which is a division of application No. 15/454,402, filed on Mar. 9, 2017, now Pat. No. 10,245,687, which is a division of application No. 13/890,537, filed on May 9, 2013, now Pat. No. 9,623,522, which is a division of application No. 12/797,154, filed on Jun. 9, 2010, now Pat. No. 8,458,874.

(60) Provisional application No. 61/185,461, filed on Jun. 9, 2009.

(51) Int. Cl.
  *B65H 19/10*  (2006.01)
  *B65H 19/22*  (2006.01)
  *B65H 20/22*  (2006.01)

(52) U.S. Cl.
  CPC ..... *B65H 20/22* (2013.01); *B65H 2701/1942* (2013.01); *Y10T 29/49826* (2015.01); *Y10T 29/49863* (2015.01); *Y10T 29/4987* (2015.01); *Y10T 29/53539* (2015.01); *Y10T 29/53657* (2015.01); *Y10T 74/2107* (2015.01); *Y10T 156/1033* (2015.01)

(58) Field of Classification Search
  CPC .......... Y10T 29/49863; Y10T 29/4987; Y10T 29/53539; Y10T 29/53657
  USPC ......................................................... 29/446
  See application file for complete search history.

(56) References Cited

U.S. PATENT DOCUMENTS

| | | |
|---|---|---|
| 2,835,963 A | 5/1958 | Thomson, Jr. |
| 3,261,734 A | 7/1966 | Long |
| 3,313,667 A | 4/1967 | Flood |
| 3,714,756 A | 2/1973 | MacInnes et al. |
| 3,862,486 A | 1/1975 | McArdle |
| 3,959,949 A | 6/1976 | Benno et al. |
| 4,163,686 A | 8/1979 | Risi |
| 4,169,343 A | 10/1979 | McArdle |
| 4,215,460 A | 8/1980 | Amberg et al. |
| 4,236,305 A | 12/1980 | Hetherington |
| 4,318,685 A | 3/1982 | Konstantin |
| 4,401,020 A | 8/1983 | Brux |
| 4,470,241 A | 9/1984 | Parry |
| 4,519,178 A | 5/1985 | Crabb, Jr. |
| 4,519,186 A | 5/1985 | Winter et al. |
| 4,570,415 A | 2/1986 | Centeno |
| 4,668,327 A | 5/1987 | Voltmer |
| 4,674,270 A | 6/1987 | Tonus |
| 4,729,811 A | 3/1988 | DiFrank |
| 4,840,320 A | 6/1989 | Shigeta |
| 4,848,691 A | 7/1989 | Muto |
| 4,859,270 A | 8/1989 | Martin |
| 4,892,611 A | 1/1990 | Wheeler |
| 5,024,718 A | 6/1991 | Hannen |
| 5,033,688 A | 7/1991 | Georgitsis |
| 5,039,374 A | 8/1991 | Winter |
| 5,040,355 A | 8/1991 | Tirelli |
| 5,045,134 A | 9/1991 | Schenker |
| 5,066,345 A | 11/1991 | Long |
| 5,101,701 A | 4/1992 | Boldrini |
| 5,129,294 A | 7/1992 | Boldrini |
| 5,190,234 A | 3/1993 | Ezekiel |
| 5,241,743 A | 9/1993 | Hubbs et al. |
| 5,275,681 A | 1/1994 | Hettler |
| 5,297,751 A | 3/1994 | Boldrini |
| 5,569,351 A | 10/1996 | Menta |
| 5,573,626 A | 11/1996 | Rossini |
| 5,643,395 A | 7/1997 | Hinton |
| 5,746,880 A | 5/1998 | Umino |
| 5,762,283 A | 6/1998 | Buchmeyer |
| 5,772,150 A | 6/1998 | Spatafora |
| 5,779,835 A | 7/1998 | Rello et al. |
| 5,935,361 A | 8/1999 | Takahashi |
| 5,975,457 A | 11/1999 | Forbes |
| 6,013,148 A | 1/2000 | Bluemle |
| 6,030,496 A | 2/2000 | Baggot |
| 6,051,095 A | 4/2000 | Butterworth |
| 6,145,183 A | 11/2000 | Mauer |
| 6,440,268 B1 | 8/2002 | Baggot |
| 6,451,145 B1 | 9/2002 | Forbes |
| 6,488,800 B1 | 12/2002 | Pankake |
| 6,758,432 B1 | 7/2004 | Rufo |
| 7,596,928 B2 | 10/2009 | Irwin |
| 8,458,874 B2 | 6/2013 | Ziegler |
| 9,623,522 B2 | 4/2017 | Ziegler |
| 10,245,687 B2 | 4/2019 | Ziegler |
| 11,014,204 B2 | 5/2021 | Ziegler |
| 2003/0153447 A1 | 8/2003 | Block et al. |
| 2009/0277140 A1 | 11/2009 | Tsuruta et al. |
| 2011/0079123 A1 | 4/2011 | Irwin |

FOREIGN PATENT DOCUMENTS

| | | |
|---|---|---|
| EP | 0 870 684 A1 | 10/1998 |
| WO | WO 02/089099 A2 | 11/2002 |
| WO | WO 2007/046137 A1 | 4/2007 |

OTHER PUBLICATIONS

Office Action for U.S. Appl. No. 12/797,154 dated Jul. 26, 2012.
Response to Restriction Requirement for U.S. Appl. No. 12/797,154 dated Aug. 14, 2012.
Office Action for U.S. Appl. No. 12/797,154 dated Oct. 24, 2012.
Amendment A and Response to Office Action for U.S. Appl. No. 12/797,154 dated Jan. 24, 2013.
Notice of Allowance and Fee(s) Due for U.S. Appl. No. 12/797,154 dated Feb. 19, 2013.
Part B—Fee(s) Transmittal for U.S. Appl. No. 12/797,154 dated May 13, 2013.
Issue Notification for U.S. Appl. No. 12/797,154 dated May 22, 2013.
Supplementary European Search Report for EP 10 78 6881 dated Nov. 6, 20154,519.
Office Action for U.S. Appl. No. 13/890,537 dated Apr. 10, 2015.
Response to Restriction Requirement for U.S. Appl. No. 13/890,537 dated May 8, 2015.
Office Action for U.S. Appl. No. 13/890,537 dated Aug. 12, 2015.
Amendment A and Response to Office Action for U.S. Appl. No. 13/890,537 dated Nov. 12, 2015.
Office Action for U.S. Appl. No. 13/890,537 dated Jan. 29, 2016.
Request for Continued Examination (RCE) Transmittal for U.S. Appl. No. 13/890,537 dated Apr. 8, 2016.
Amendment B and Response to Final Office Action for U.S. Appl. No. 13/890,537 dated Apr. 8, 2016.
Office Action for U.S. Appl. No. 13/890,537 dated May 11, 2016.
Amendment C and Response to Office Action for U.S. Appl. No. 13/890,537 dated Aug. 8, 2016.
Office Action for U.S. Appl. No. 13/890,537 dated Oct. 4, 2016.
Amendment D and Response to Final Office Action for U.S. Appl. No. 13/890,537 dated Dec. 14, 2016.
Notice of Allowance and Fee(s) Due for U.S. Appl. No. 13/890,537 dated Dec. 23, 2016.
Issue Fee Transmittal for U.S. Appl. No. 13/890,537 dated Mar. 9, 2017.
Issue Notification for U.S. Appl. No. 13/890,537 dated Mar. 29, 2017.
Office Action for U.S. Appl. No. 15/454,402 dated May 4, 2018.
Response to Restriction Requirement for U.S. Appl. No. 15/454,402 dated May 23, 2018.
Office Action for U.S. Appl. No. 15/454,402 dated Jul. 20, 2018.
Amendment A and Response to Office Action for U.S. Appl. No. 15/454,402 dated Sep. 4, 2018.

(56) References Cited

OTHER PUBLICATIONS

Notice of Allowance and Fee(s) Due for U.S. Appl. No. 15/454,402 dated Nov. 27, 2018.
Issue Fee Transmittal Form for U.S. Appl. No. 15/454,402 dated Feb. 19, 2019.
Issue Notification for U.S. Appl. No. 15/454,402 dated Mar. 13, 2019.
Issue Fee Transmittal Form for U.S. Appl. No. 16/279,292 dated Apr. 23, 2021.
Notice of Allowance and Fee(s) Due for U.S. Appl. No. 16/279,292 dated Feb. 3, 2021.
Response to Office Action for U.S. Appl. No. 16/279,292 dated Jan. 15, 2021.
Office Action for U.S. Appl. No. 16/279,292 dated Oct. 19, 2020.
Request for Continued Examination (RCE) Transmittal for U.S. Appl. No. 16/279,292 dated Sep. 28, 2020.
Amendment B and Response to Final Office Action for U.S. Appl. No. 16/279,292 dated Sep. 28, 2020.
Office Action for U.S. Appl. No. 16/279,292 dated Jun. 30, 2020.
Amendment A and Response to Office Action for U.S. Appl. No. 16/279,292 dated Jun. 12, 2020.
Office Action for U.S. Appl. No. 16/279,292 dated Mar. 16, 2020.
Response to Restriction Requirement for U.S. Appl. No. 16/279,292 dated Mar. 4, 2020.
Office Action for U.S. Appl. No. 16/279,292 dated Feb. 4, 2020.
Issue Notification for U.S. Appl. No. 16/279,292 dated May 25, 2021.
Issue Fee Transmittal Form for U.S. Appl. No. 17/238,405 dated May 23, 2023.
Notice of Allowance and Fee(s) Due for U.S. Appl. No. 17/238,405 dated Mar. 16, 2023.
Amendment A and Response to Office Action for U.S. Appl. No. 17/238,405 dated Feb. 22, 2023.
Office Action for U.S. Appl. No. 17/238,405 dated Nov. 22, 2022.
Response to Restriction Requirement for U.S. Appl. No. 17/238,405 dated Oct. 20, 2022.
Office Action for U.S. Appl. No. 17/238,405 dated Sep. 20, 2022.

* cited by examiner

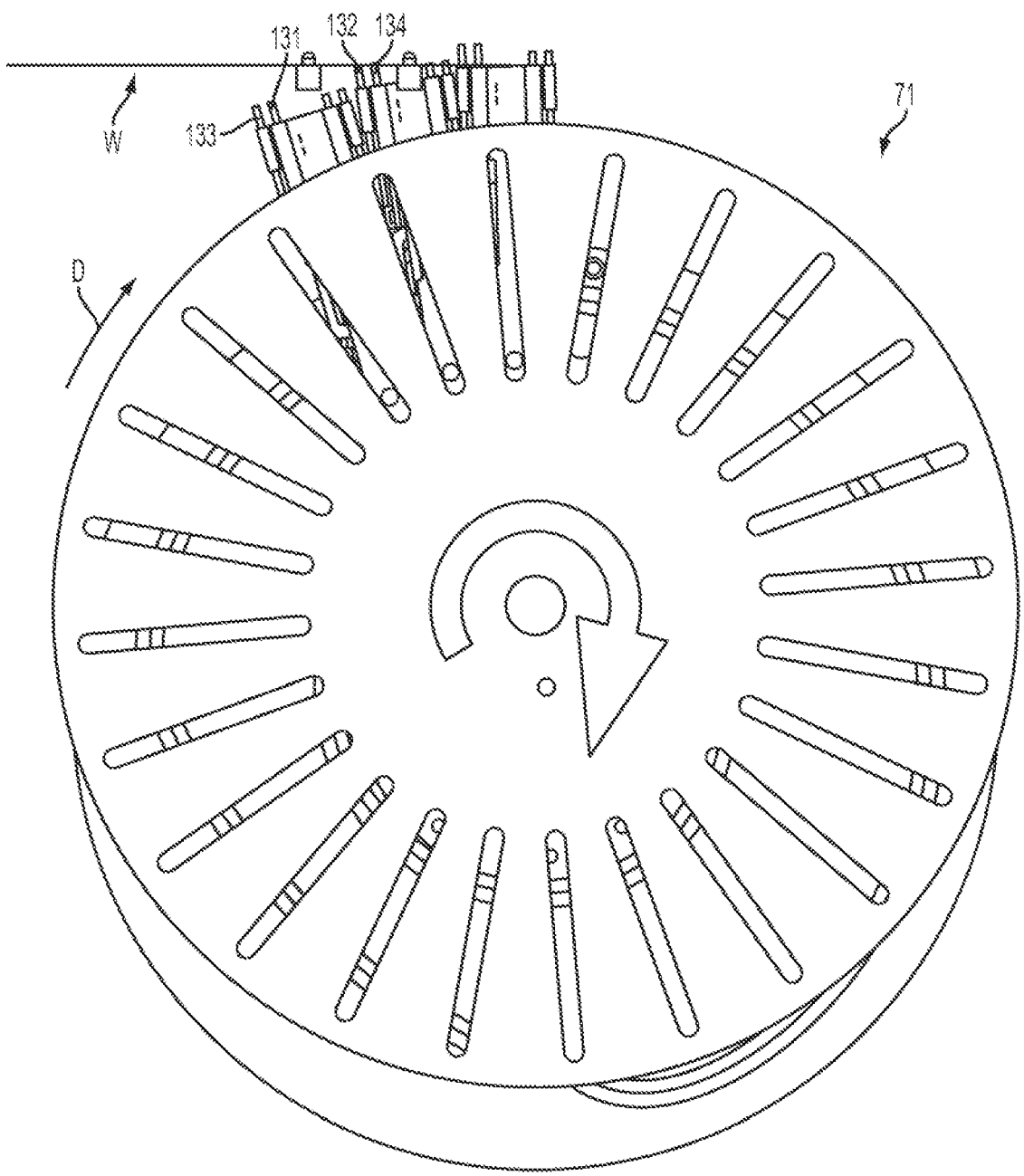
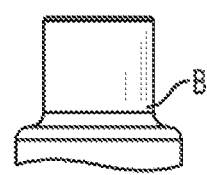
FIG. 19

ARTICLE SELECTION AND PLACEMENT ASSEMBLY

CROSS-REFERENCE TO RELATED APPLICATIONS

This application is a divisional of U.S. patent application Ser. No. 17/238,405, filed Apr. 23, 2021, which is a divisional of U.S. patent application Ser. No. 16/279,292, filed Feb. 19, 2019, now U.S. Pat. No. 11,014,204, which is a divisional of U.S. patent application Ser. No. 15/454,402, filed Mar. 9, 2017, now U.S. Pat. No. 10,245,687, which is a divisional of U.S. patent application Ser. No. 13/890,537, filed May 9, 2013, now U.S. Pat. No. 9,623,522, which is a divisional of U.S. patent application Ser. No. 12/797,154, filed Jun. 9, 2010, now U.S. Pat. No. 8,458,874, which application claims the benefit of U.S. Provisional Application No. 61/185,461, filed Jun. 9, 2009.

INCORPORATION BY REFERENCE

The disclosures of U.S. patent application Ser. No. 17/238,405, filed Apr. 23, 2021, U.S. patent application Ser. No. 16/279,292, filed Feb. 19, 2019, U.S. patent application Ser. No. 15/454,402, filed Mar. 9, 2017, U.S. patent application Ser. No. 13/890,537, filed May 9, 2013, U.S. patent application Ser. No. 12/797,154, filed Jun. 9, 2010, and U.S. Provisional Application No. 61/185,461, filed Jun. 9, 2009, are hereby incorporated by reference for all purposes as if presented herein in their entirety.

TECHNICAL FIELD

This disclosure relates generally to article selection and placement machinery. More specifically, methods and devices are disclosed for feeding a web containing groups of articles, selecting an article from the group of articles in continuous succession from the web, and placing the article onto an object selected from a group of objects, also moving in continuous succession. The devices and methods are well suited for the packaging industry, where articles, such as tags, are placed onto selected objects, such as bottles or other containers.

BACKGROUND

In the packaging industry, high speed packaging machines commonly package thousands of items such as beverage bottles in a single production run and at high speeds. It is sometimes desirable to place advertising or other indicia on the bottles in a removable manner before they are packaged. One way to do this is to place a tag containing the indicia onto the neck of each bottle where the tags are held in place with elastic anchor bands that are secured to one end of the tags. Such tags exist in the form of long ribbons or webs wherein multitudes of tags and their elastic anchor bands are defined in the web by score lines or partial cuts so that each tag and its band can be detached from the web. A need exists for a apparatus and method for removing these tags from the web and placing their elastic anchor bands over the tops of bottles (or other objects) at high rates, in continuous succession, and in a reliable and efficient manner. There also exists a need for such an apparatus to be easily reloaded or re-threaded with a new web of tags when one web supply is exhausted to minimize the down time required to reload the apparatus. It is to the provision of such an apparatus and to the corresponding method that the present disclosure is primarily directed.

SUMMARY

Briefly described, an apparatus and method for placing a tag having an elastic band onto an object such as the top portion of a beverage bottle is disclosed. The apparatus has a downstream end and an upstream end. An infeed assembly at the downstream end of the apparatus carries a pair of reels each configured to carry a wound web having a multitude of tags detachably defined therein. Each tag includes an elastic anchor band at one end, which also is detachably defined in the web. A guide rail and roller assembly is associated with each web reel so that the web from each reel can be threaded into the machine independently from the web from the other reel. A conveyor assembly upstream of the infeed assembly and guide rails is configured to receive the threaded web and convey the web in a generally upstream direction.

A placing assembly is positioned adjacent an upstream end of the conveyor assembly beneath the moving web. The placing assembly includes a rotating radially arranged array of jaw assemblies having distal ends that pass just beneath the web and thus the tags defined therein. Each jaw assembly has a distal end that can be selectively opened and closed and sets of pins on the distal end can independently be extended and retracted. As the closed distal ends of the jaw assemblies approach the web with their pins extended, the pins of each jaw assembly move through the elastic anchor band of a corresponding tag to capture the band on the pins. A selector assembly is also positioned at the upstream end of the conveyor assembly and includes a rotating wheel having vacuum cups arrayed about its periphery. The wheel is substantially aligned above the placing assembly and rotates above the moving web. As the wheel rotates, its vacuum cups engage and push down on the tags of the web just after the anchor bands of the tags are captured by the pins of the jaw assemblies. This action detaches the tags and their elastic bands from the web so that each jaw assembly carries a freed tag.

As the jaw assemblies and tags rotate downwardly toward a line of synchronously moving bottles, the jaws of the jaw assemblies are progressively opened through the action of a cam and cam follower. This moves the pin sets apart to stretch the elastic anchor bands to a wider diameter. The rotating and open ends of each jaw assembly then move over the top of a corresponding moving bottle below and the pins are retracted by another cam and cam follower arrangement. This releases the elastic anchor band, which then snaps elastically onto the top of its bottle to attach the tag to the bottle. The jaw assemblies are then closed by the cams and cam followers and their pins are again extended as they rotate back up toward the moving web for another cycle.

An apparatus and method are thus provided that applies tags to the tops of objects such as beverage bottles in rapid succession and in a way that is very reliable and efficient. The apparatus can be re-threaded with new web upon exhaustion of one web due to the dual supply reels and dual guide rail assemblies at the downstream end of the apparatus, thus minimizing down time. These and other features, aspects, and advantages of the method and apparatus disclosed herein will become more apparent upon review of the detailed description set forth below when taken in conjunction with the accompanying drawing figures, which are briefly described as follows.

BRIEF DESCRIPTION OF THE DRAWINGS

FIG. 19 is a side view of the article placement assembly illustrating the offset relationship of the slotted wheel and the jaw hub of the article placement assembly.

DETAILED DESCRIPTION

Figure 1:
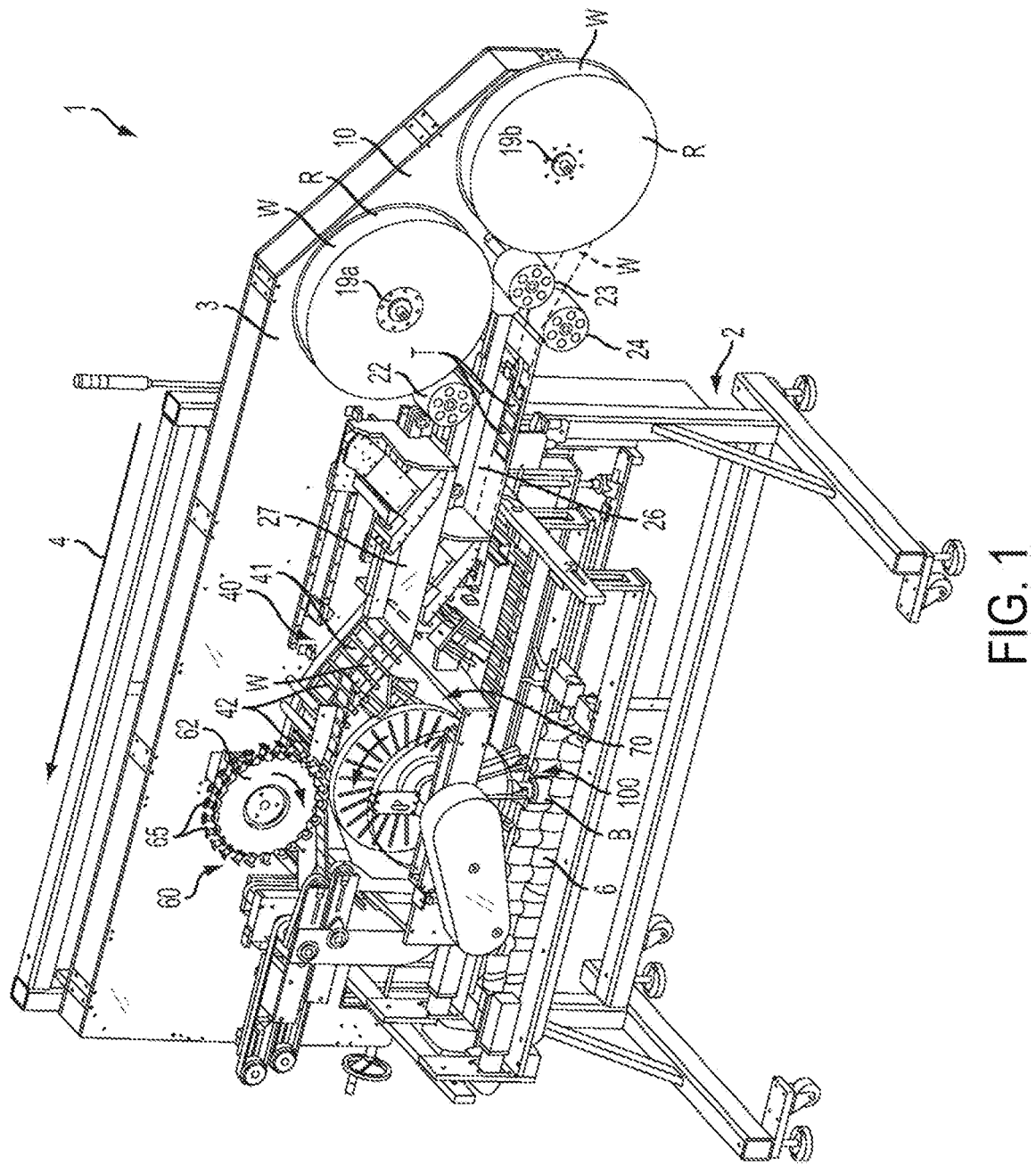
FIG. 1 is a perspective view of am article selection and placement assembly according to one embodiment of the disclosure.

Reference will now be had to the drawing figures, wherein like parts are identified with like reference numerals throughout the several views. Where indicated, a group of figures may be referenced together in the interest of clarity and brevity.

FIG. 1 illustrates an article selection and placement assembly according to a preferred embodiment of the invention. In the illustrated embodiments, the articles to be selected and placed on objects such as bottles are plastic tags, and will be described as such herein for clarity. However, articles other than plastic tags may be used and are within the scope of the term "tags" used herein.

In general, the assembly 1 comprises a frame 2 constructed and configured to support the functional components of the assembly. A cowling 3 is secured to the frame and houses one or more drive trains for rotating or otherwise moving components of the assembly, as detailed below. The assembly 1 has a downstream end to the right in FIG. 1 and an upstream end to the left in FIG. 1. An infeed assembly 10 is mounted at the downstream end of the assembly 1 and includes hubs 19a and 19b onto which are mounted respective reels R containing webs W defining a multitude of sequentially arranged tags T. A lower guide rail 26 and an upper guide rail 27 are disposed upstream of the infeed assembly 10. A web W is drawn from one or the other of the reels R and guided by respective guide rolls 22 or 23 onto respective guide rail 26 or 27, along which the web W moves in an upstream direction indicated by arrow 4. The lower guide rail 26 is associated with the bottommost web W and the upper guide rail 27 is associated with the uppermost web W.

A conveyor assembly 40 is disposed at the upstream ends of the guide rails 26 and 27 and comprises an endless belt 41 carrying an array of spaced transverse bars 42. The conveyor assembly and its function are described in detail below. Generally, however, the moving web W transfers from the upstream end of its associated guide rail 26 or 27 onto the transverse bars 42 of the conveyor assembly 40. The transverse bars 42 carry the web further upstream and simultaneously move them upwardly along an inclined flight of the endless belt 41. An uppermost flight of the conveyor 40 is substantially level or inclined slightly downwardly so that the transverse bars 42 and the web W containing tags T carried thereby are moved beneath an article selector assembly 60. The article selector assembly 60 generally comprises a rotating star wheel 62 that carries an array of vacuum cups 65 about its periphery. As described in more detail below, as the star wheel 62 rotates above the moving web W, the vacuum cups 65 sequentially engage respective tags T defined on the web, each of which is disposed between a pair of transverse bars 42. Each vacuum cup 65 presses downwardly on a respective tag T of the web W, causing the tag, which is defined by score lines or other lines of weakness in the web, to be "punched out of" and thereby separated or detached from the web. A vacuum applied to the vacuum cup 65 stabilizes the separated tag and holds it in place.

As each tag T approaches the position where it is detached from the web W by the selector assembly, an elastic anchor band 14 (FIG. 2) of the tag is captured by an article placing assembly 70 disposed beneath the selector assembly 60. The article placing assembly 70 will be described in substantial detail below. Generally, however, the article placing assembly carries a radially arranged array of jaw assemblies 100 (only three of which are illustrated in FIG. 1) that rotate in a counterclockwise direction in FIG. 1, as indicated by the arrow, above a timing screw 6. The timing screw moves a linear array of bottles B (or other objects) in a downstream direction beneath and in synchronization with the rotating jaw assemblies 100 of the article placing assembly 70. The rotating jaw assemblies successively capture the elastic anchor bands of tags T on pins projecting from distal ends of the jaw assemblies as the distal ends rotate beneath the web and immediately thereafter each of the captured tags is detached from the web by the selector 60 so that each jaw assembly carries a freed tag. As the tags are rotated downwardly on the jaw assemblies toward bottles below, the jaw assemblies open up and stretch the elastic anchor band of each tag so that it is large enough to fit over the top of a bottle B below. Each stretched elastic anchor band is then progressively moved over the top of a respective bottle B as the jaw assemblies rotate into alignment with the bottle. The pins on which the elastic anchor band is held are then retracted, causing the band to "snap" onto the top of the bottle B like a rubber band. The elastic anchor band, and thus the tag to which it is attached, are thereby securely but removably attached to the bottle top. Furthermore, the just described process can be carried out reliably at high speeds to match those of modern packaging machines.

In summary, the assembly 1 is adapted to feed a web carrying a multitude of removable articles, such as information tags, to a selector assembly 60, to transfer the articles to an article placement assembly, to manipulate or prepare the articles for placement onto an object, and finally to place the article onto a selected object. All of these actions occur in continuous fashion, as the objects, such as beverage containers, are fed along a second path of travel. Although the description herein is largely presented in the context of placing tags onto the neck portions of bottles, the method and apparatus can be utilized to place articles onto or within any object that is sized or shaped to receive the article. The embodiment shown is especially well suited for placing tags having an elastic anchor band that fits around a container, to hold the tag to the container.

As mentioned above, the article selection and placement assembly 1 includes a web supply and in-feed assembly 10, a web conveyor assembly 40, an article selector assembly 60, and an article placing assembly 70. The article placing assembly 70 also is designed to manipulate or prepare the articles, such as tags T, as they are being position for placement onto, for example, the neck of a bottle B. The objects, in the present example, bottles, are conveyed adjacent to, or beneath, the article placement assembly by a bottle conveyor (not shown) and are spaced sequentially by timing screw 6. The present inventions are particularly useful in association with continuous motion, relatively high speed, packaging machines (not shown) in which bottles or cans, are arranged or grouped, and placed in a carrier, such as a carton.

Figure 2:
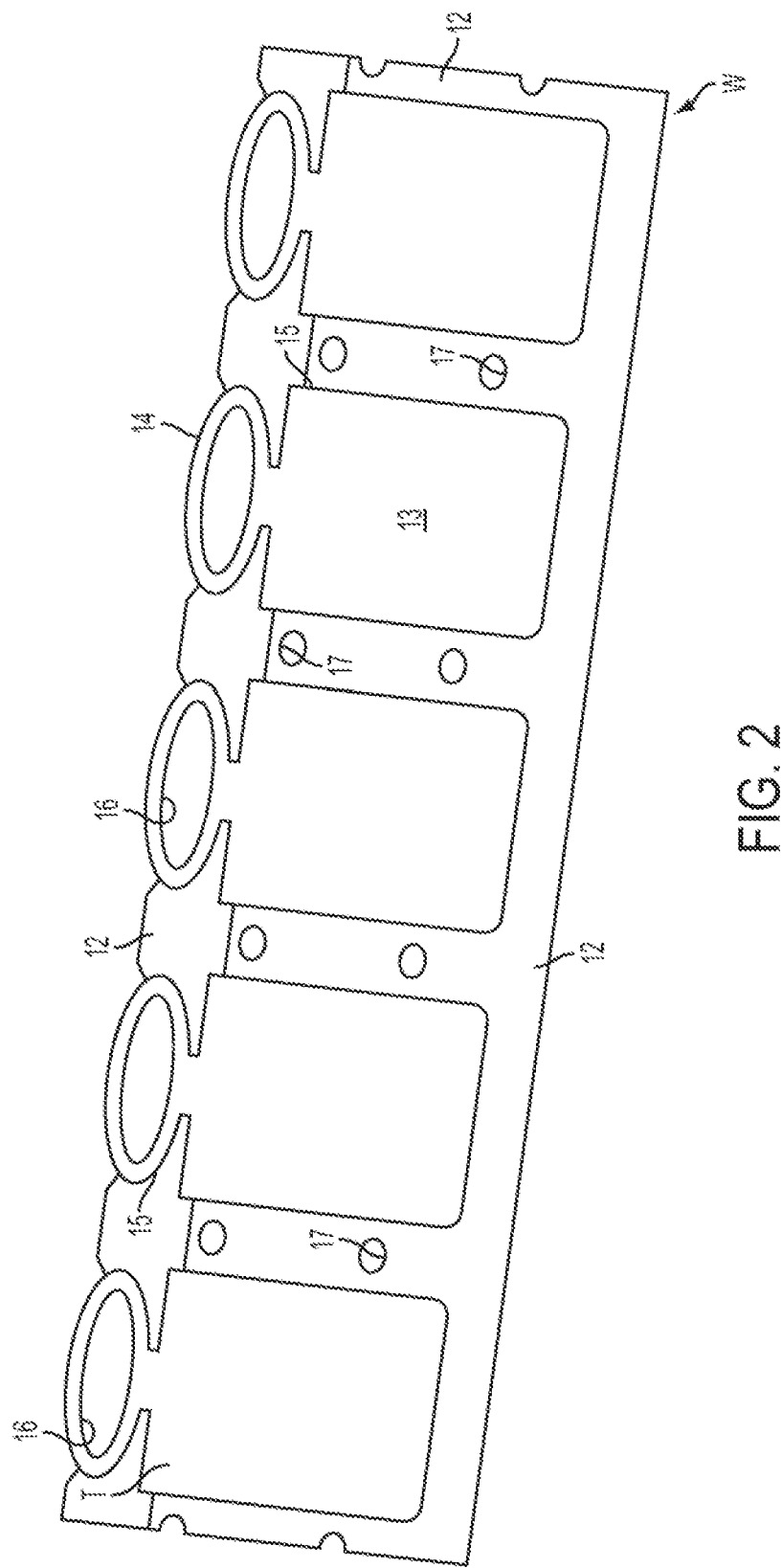
FIG. 2 is a perspective view of an exemplary web that carries groups of articles, in this case tags to be placed on containers.

FIG. 2 shows a section of a web W having a multitude tags T detachably formed, such as by stamping or otherwise scoring, into a substrate 12 of plastic material or synthetic material. Paper or another material might be used. The tags T include a body portion 13, rectangular in the illustrated embodiment, and an elastic anchor band 14. The body portion 13 and part of the anchor band 14 is defined by perforated line or score line or tear line 15, and the body portion 13 is sized to receive a printed message or other indicia. The tag T also could receive a magnetic strip coded with information, a computer chip, and RFID chip, or the like. The anchor band 14 of tag T is shaped generally as a band defining an opening 16, and is comprised of an elastic, synthetic material that permits this portion of the tag T to be mechanically stretched, so that opening 16 is enlarged. Once a mechanical force applied outwardly to the inner sides of opening 16 is relaxed, the opening will retract or snap back toward its initial size and shape rather like a rubber band. The substrate upon which the tags are formed also defines two rows of holes 17 that cooperate with pins, discussed below, to allow the web W to be pulled in proper alignment through assembly 1. These types of tags are shown in U.S. Pat. No. 7,281,345 and U.S. patent D532,049, and are marketed commercially under the name ElastiTag®. An elongate web W of tags T is wound onto reels 17a and 17b, so that each reel contains hundreds or thousands of tags consecutively arranged along web W and capable of being mechanically punched out or otherwise separated or detached from substrate 12.

Figure 3:
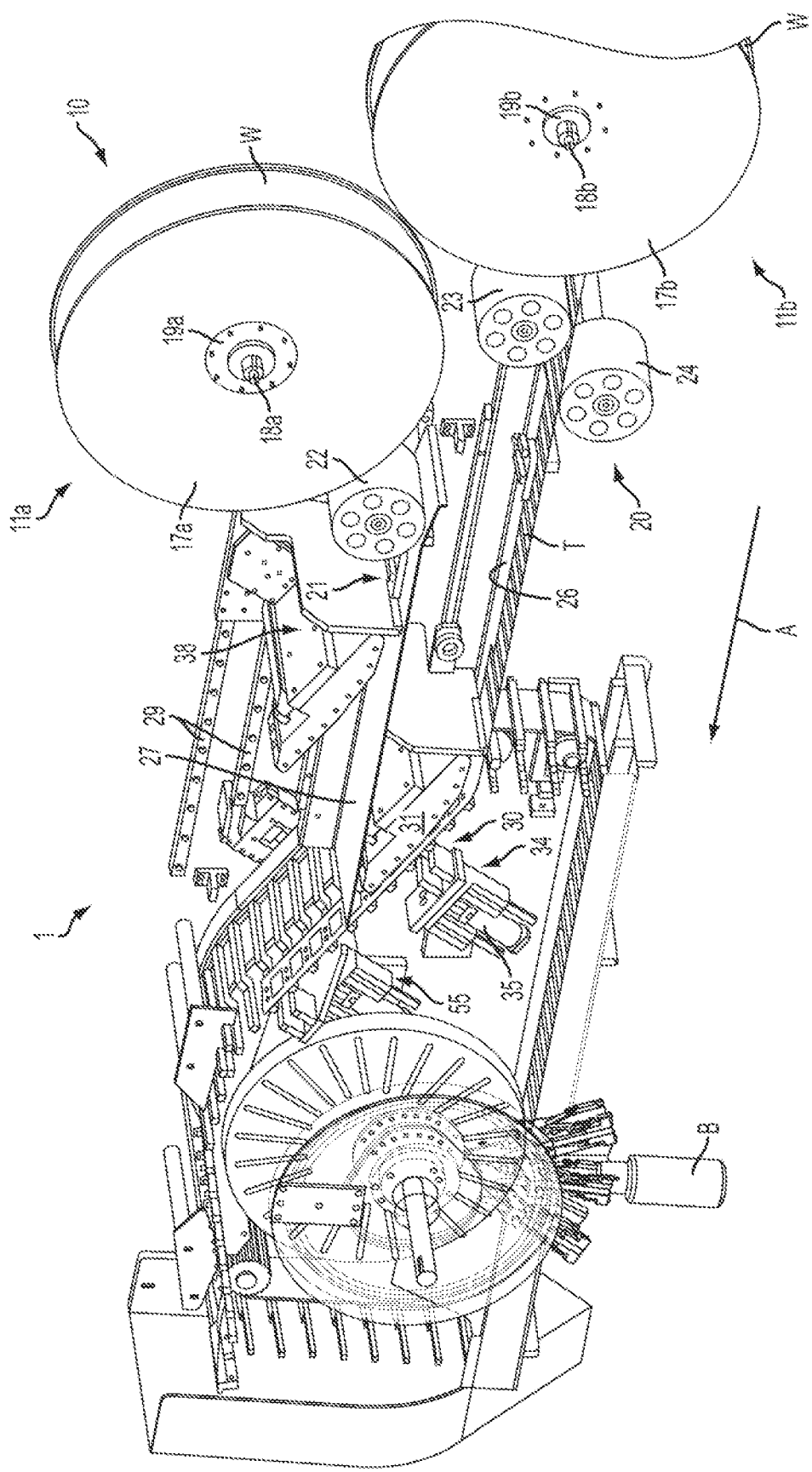
FIG. 3 is a perspective view of key components of the article selection and placement assembly of FIG. 1.

Referring in more detail to FIG. 3, the in-feed assembly 10 includes two reels 17a and 17b carrying rolls 11a and 11b of web in order to increase the number of tags available for the selection and placement operation, and to allow the operation to continue virtually uninterrupted by a web changeover. Only one roll 11a or 11b is operable at a time to provide web in-feed during operation of the apparatus 1. As the one roll is progressively paid out, an operator may place a full roll on the other reel and thread it into a ready position in the machine. When the first roll is exhausted, the web of the second roll is automatically fed from its already threaded and queued position to the conveyor assembly of the machine, and becomes the new web supply virtually immediately. The machine may stop instantaneously as the new web is moved onto the arms of the conveyor, but this pause can easily be compensated for. Thus, the machine operates virtually continuously with no down time required for switching from a spent roll of web to a fresh roll of web. The treading and changeover operation is described in more detail below.

The reels 17a and 17b are rotated, as is well known in the art, about shafts 18a and 18b using hubs 19a and 19b. The reels may not be driven, but may freely rotate in the clockwise direction as viewed in FIG. 3, as their associated webs are pulled or drawn through assembly 1.

Figure 6:
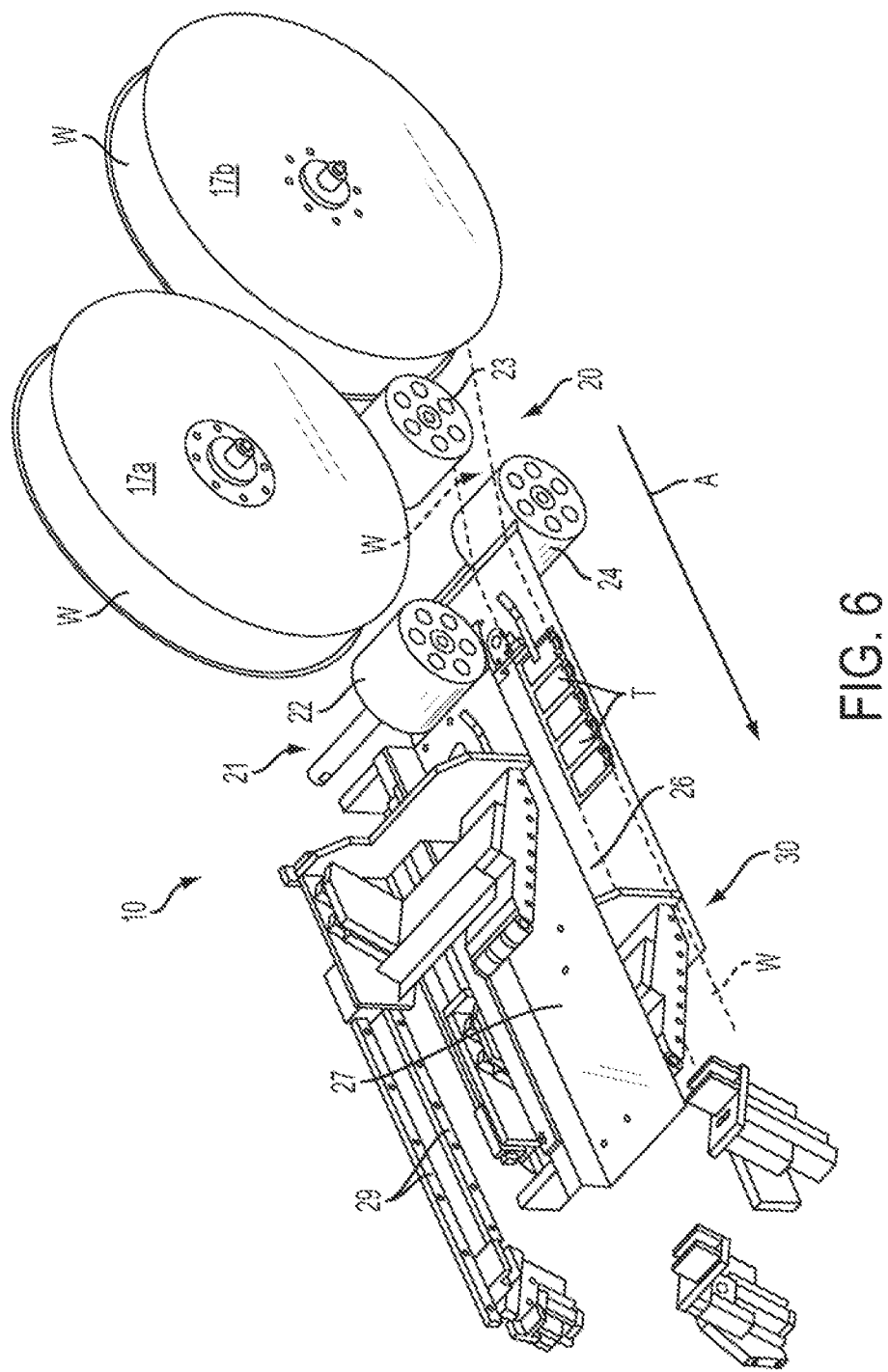
FIG. 6 is a perspective view showing special relationships between components of the web conveyor assembly.

The web supply and in-feed assembly 10 also includes dual guide assemblies 20 and 21, also shown in FIG. 6, that guide the web from the respective reel to the respective guide rail 26 or 27. Guide assembly 20 is the lower assembly, associated with reel 17b in this embodiment, and guide assembly 21 is the upper assembly, associated with reel 17a. Lower guide assembly 20 includes proximate guide roll 23 and distal guide roll 24, with roll 24 being spaced laterally in the upstream direction from roll 23. Upper guide assembly 21 includes guide roll 22 for guiding a web W from the upper reel 17a onto upper guide rail 27.

Figure 4:
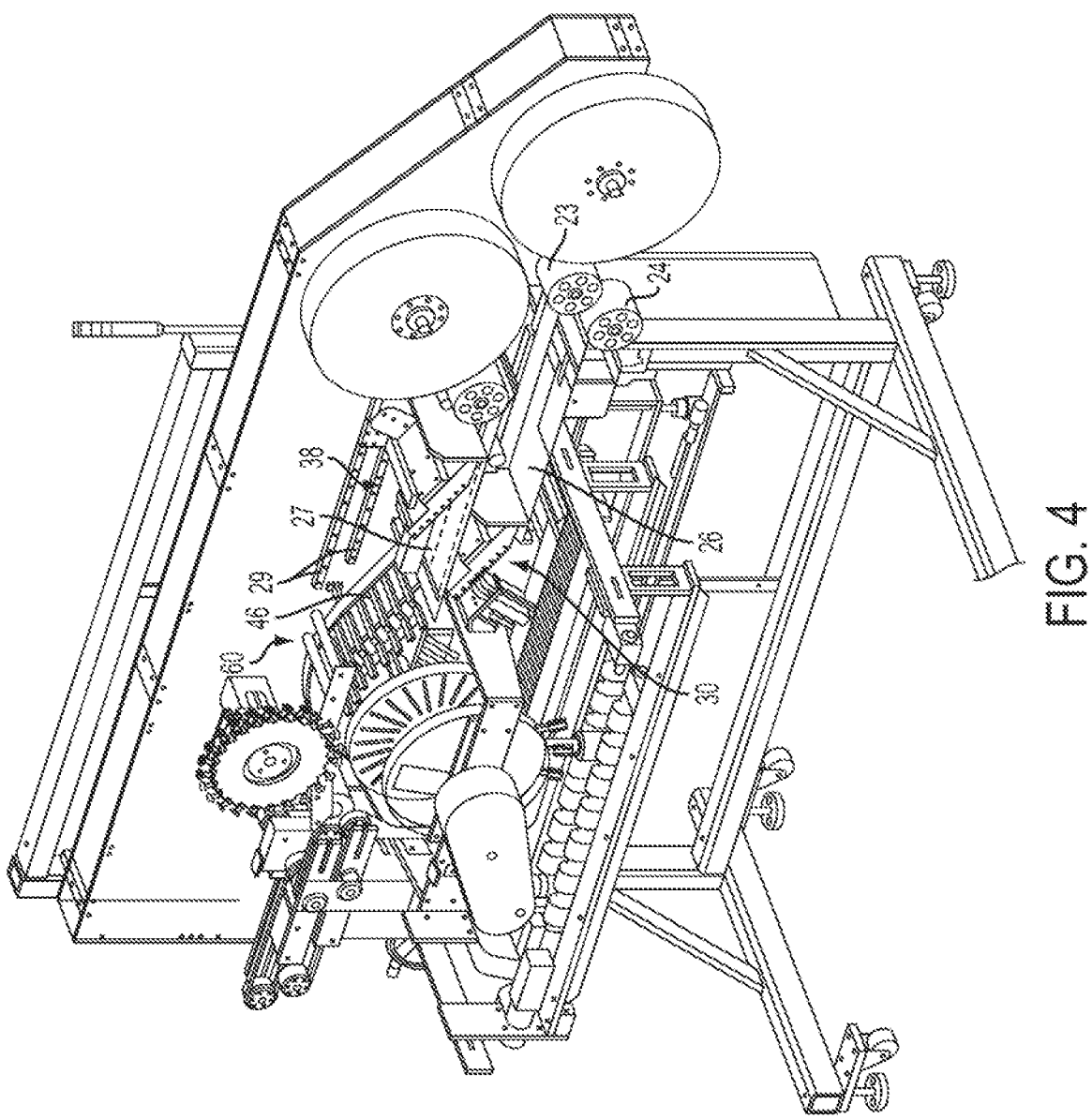
FIG. 4 is a perspective view of the article selection and placement assembly of FIG. 3 from a different viewing angle.

Referring to FIG. 4, lower guide rail 26 is a substantially flat, elongate rail that extends at one end from a position adjacent to guide roll 24 horizontally in an upstream direction, depicted by arrow A, and terminates adjacent to the inclined flight 46 of conveyor assembly 60. The guide rail 26 provides support for the web W as it is routed from the supply reel 17b upstream toward conveyor assembly 40. Similarly, upper guide rail 27 is a substantially flat, elongate rail that extends at one end from a position adjacent to guide roll 22 horizontally in the upstream direction. Upper guide rail 27 also terminates adjacent to conveyor assembly 60, but at a position further along and up the inclined flight 47 thereof than the lower guide rail 26. With this arrangement, as the web W from one reel 17a or 17b is being drawn into the machine during operation, the web W from the other reel is threaded by an operator across the respective guide rail and affixed to the associated guide roller as detailed below. The leading end of a new web is thus in position so that when the old web is exhausted, the machine can load the new web onto the conveyor automatically and very quickly. It may take tens of minutes for a web to be exhausted, so the operator has plenty of time to queue the new web before an old web is exhausted. The assembly 1 can thus continue to operate in a substantially uninterrupted fashion.

Figure 5:
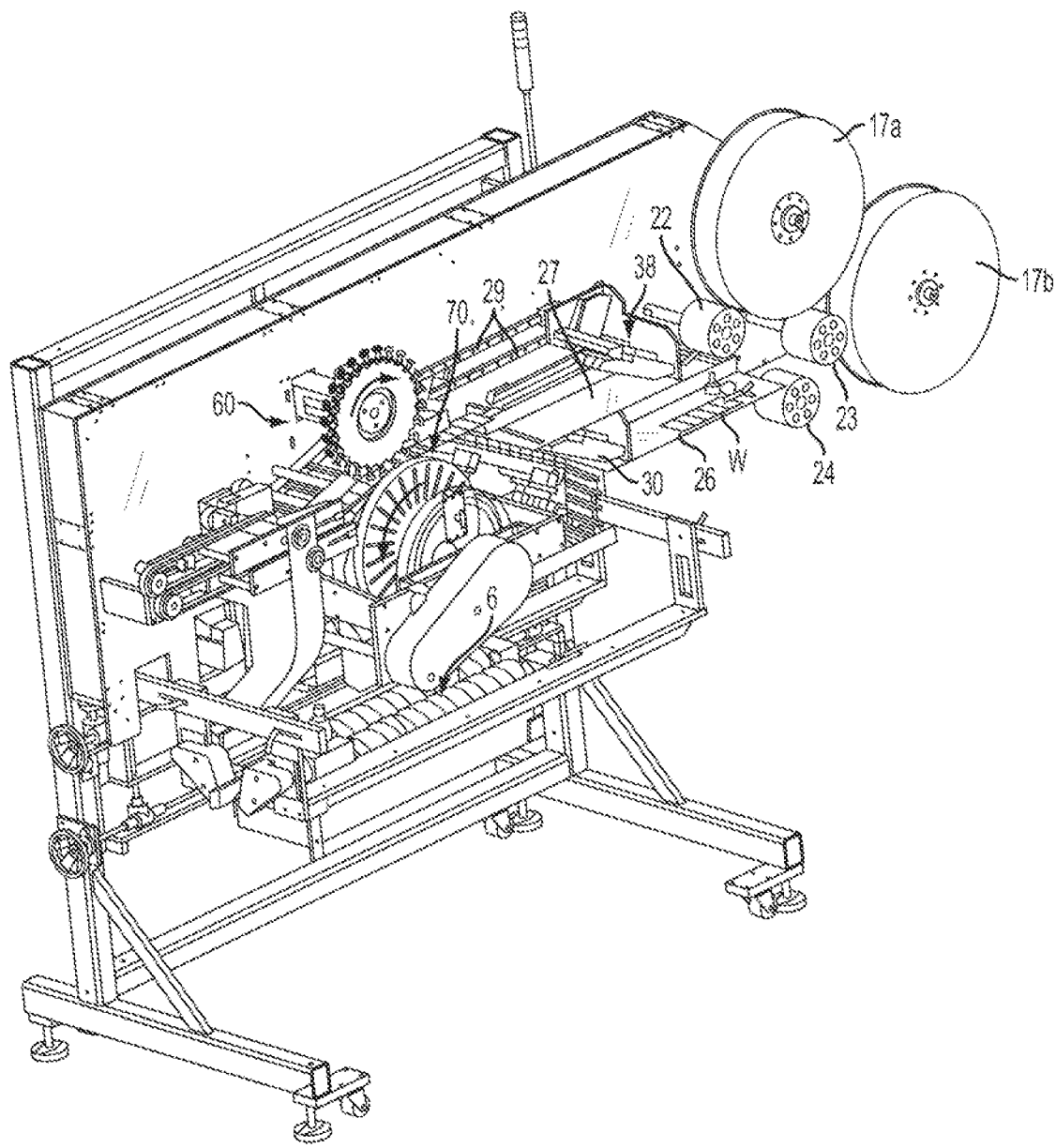
FIG. 5 is a perspective view of the article selection and placement assembly of FIG. 3 from yet a different viewing angle.

A lower roller assembly 30 is positioned above lower guide rail 26 and is movable on a pair of the guide rails 29 (FIG. 7) toward and away from the upstream end portion of the lower guide rail. A similar upper roller assembly 38 is positioned above upper guide rail 27 and is movable on rails 29 toward and away from the upstream end portion of upper guide rail 27. In this way, the upper roller assembly can be moved to a retracted and out-of-the-way as position shown in FIG. 4 when the upper web is not in use, and moved to the upstream end of the upper guide rail when the upper web is in use. As perhaps best shown in FIG. 7, the lower roller assembly 30 also is movable on similar rails in a similar manner with respect to the lower guide plate 26. A detailed description of the configuration and function of the upper and lower guide roller assemblies 30 and 38 is provided below. FIG. 5 illustrates the article selection and placement assembly 1 seen from a slightly upstream direction. The lower and upper guide rails 26 and 27 and the upper and lower roller assemblies 30 and 38 are clearly visible in FIG. 5 as are the two supply reels 17a and 17b and their associated guide rollers.

Figure 7:
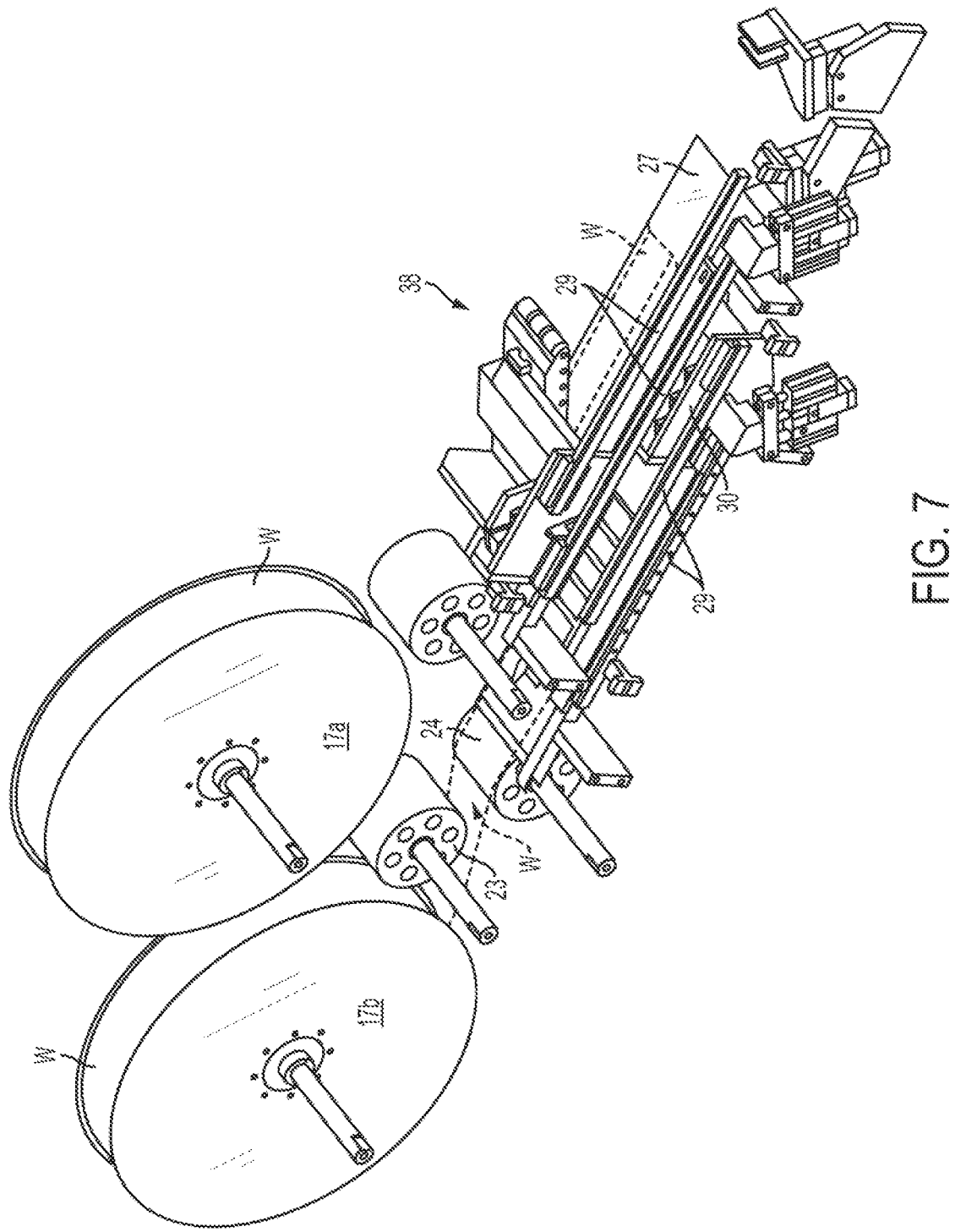
FIG. 7 is a perspective view of the web conveyor assembly of FIG. 6 from a different viewing angle.

FIGS. 6 and 7 show the infeed assembly 10 in isolated perspective and illustrate clearly the relationship between reels 17a and 17b, their guide roll assemblies 20 and 21, and upper and lower guide plates 27 and 26 respectively. The web W is shown threaded from lower reel 17b, across guide roller 24 and across lower guide plate 26. The web carries tags T arranged in a linear array along the web with web substrate therebetween. The outline of web W threaded across the upper guide rail 27 is shown; however, as stated above, only one web is drawn from only one reel at a time. FIG. 7 also illustrates the rails 29 on which the lower roller assembly 30 can move to position it between its retracted and operative positions.

Figure 8:
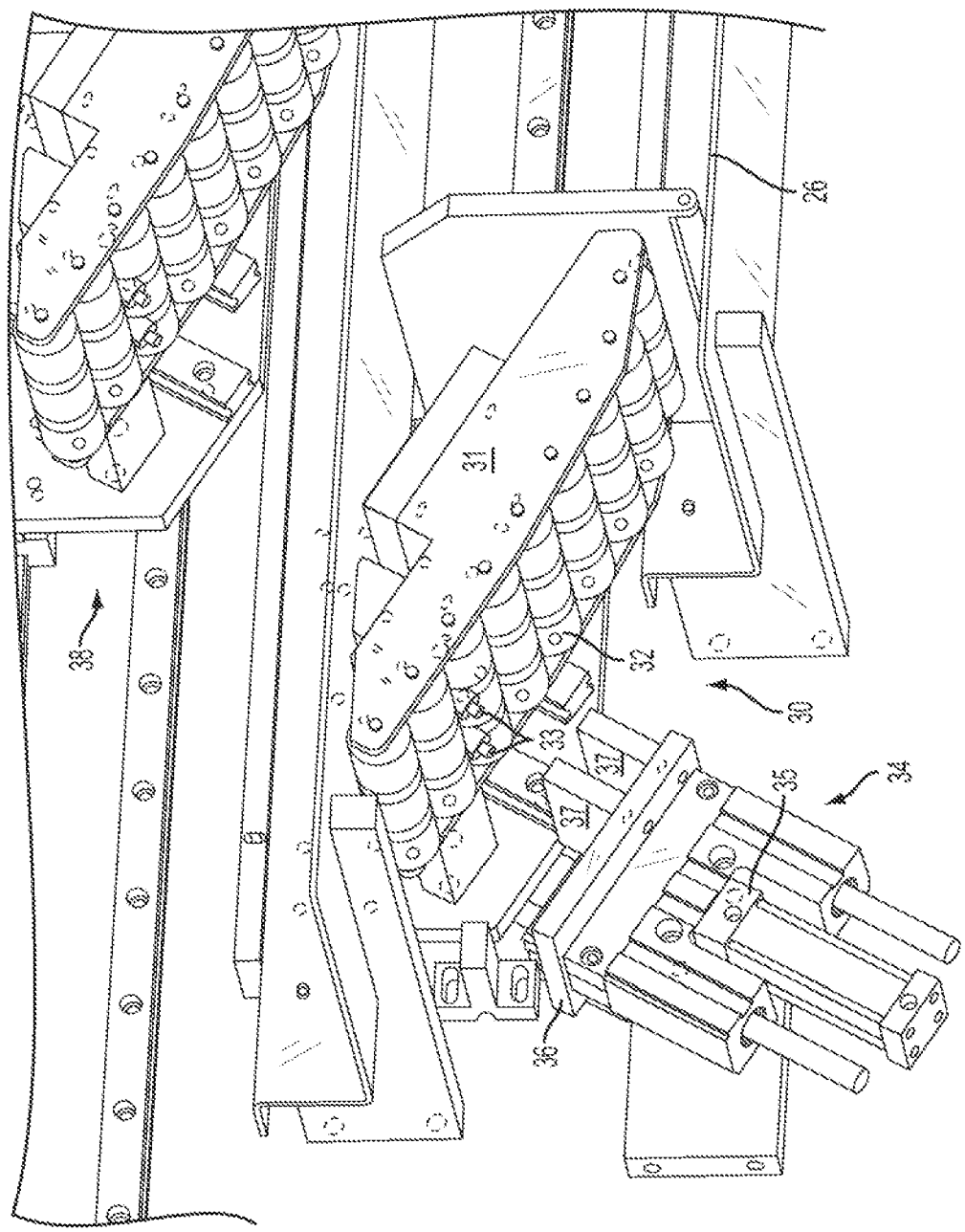
FIG. 8 is a perspective of a roller assembly of the article selection and placement assembly of the disclosure.

FIG. 8 is a detailed perspective of the lower roller assembly 30, which, it will be understood, is the same as upper roller assembly 38. Roller assembly 30 includes a body portion 31 that supports along its lower side a series of spaced rollers 32. The roller assembly 30 is mounted to the machine frame so that it can be moved toward and away from the horizontal plane in which guide rail 26 is positioned. It also is selectively movable longitudinally along rails 29 as mentioned above. Roller assembly 30 is manually placed in one of two positions and orientations, depending upon whether or not it is in use. When roller assembly is pivoted downwardly into the position shown in FIG. 3, it is in the operative or "run" position. When roller assembly 30 is pivoted upwardly in the position shown in FIG. 6, that is, away from web W, it is in the inoperative or "idle" position. Referring back to FIG. 8, Assembly 30 also includes pins 33, which are stationary and mounted to the machine frame so that when assembly is pivoted fully upwardly into the "idle" position, pins 33 protrude below the rollers 32 as shown.

An air cylinder assembly 34 is mounted below roller assembly 30, and includes air cylinder 35, which is angled upwardly toward roller assembly 30. Cylinder 35 supports a plate 36 and upstanding bars 37a and 37b, which are spaced from one another approximately the same distance as the distance between the axes of two adjacent rollers 32. When the air cylinder 35 is energized, the plate 36 and the bars 37a and 37b are moved toward the raised roller assembly 30 until the bars 37a and 37b engage respective rollers on either side of the pins 33. This pinches and captures a web in position on the roller assembly with pins 33 extending through holes 17 (FIG. 2) and thereby properly positions the web to be loaded onto the conveyor assembly 40. When the other web is exhausted, the roller assembly and air cylinder assembly, with pinched web, is moved automatically toward the conveyor until the pins of the conveyor assembly extend through the holes in the web. The air cylinder 35 is then de-energized, so that the plate and bars move away from roller assembly 30 to release the pinched web. The new web is thus properly loaded onto the conveyor ready for use. This process may take as little as one second, resulting virtually no down time required for changing from an exhausted web to a fresh web.

While the roller assemblies are described above as having an array of rollers on their bottom sides, it will be understood by those of skill in the art that other structures may be substituted for the illustrated rollers with equivalent results. For example, the rollers may be replaced with a smooth flat or curved surface with similar beneficial results. Thus, the use of rollers on the roller assemblies is not a limitation of the invention disclosed herein.

Figure 9:
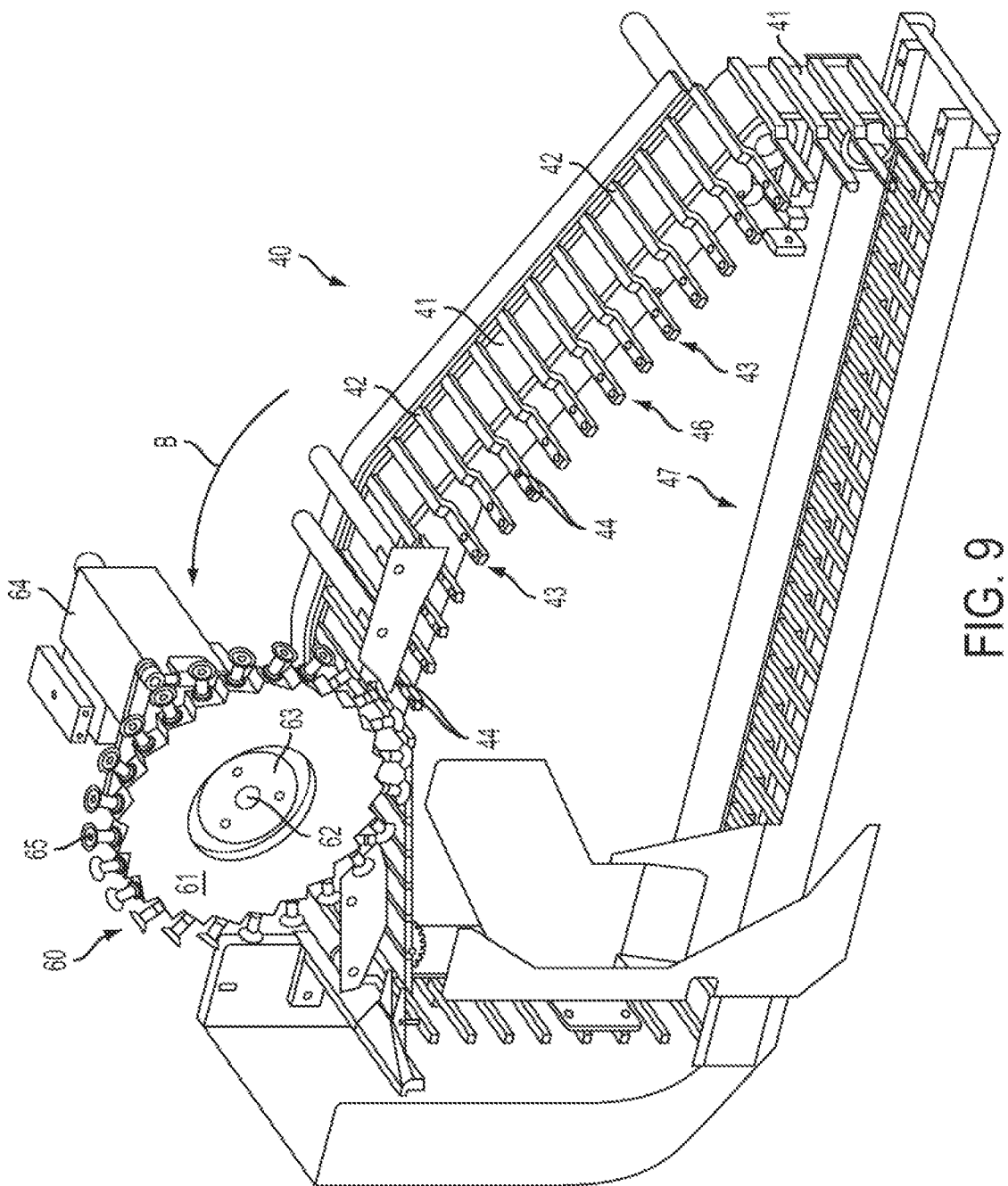
FIG. 9 is a perspective view illustrating the web conveyor assembly and associated selector assembly.

As shown in FIG. 9, the conveyor assembly is positioned upstream of the web supply and in-feed assembly 10. The conveyor assembly 40 includes endless belt 41 that supports spaced transverse bars 42 around its periphery. The endless belt 41 has an inclined flight 46 and a return flight 47. The bars 42 are mounted in stationary manner to belt 41 so as to move in a rotational path of travel along with the belt. A drive assembly (not shown) known to those skilled in the art, selectively drives belt 41 in its endless path, in a counter-clockwise direction of arrow B, thus moving transverse bars 42 upwardly along the inclined flight 46. Each spaced transverse bar 42 includes a distal end portion 43 that projects from one edge of the endless belt 41. One set of two pins 44 project upwardly from the distal end portion 43 of each bar 42 to extend through the holes 17 of a web W. The pins 44 thus carry the web upwardly along the inclined fight and position the tags T defined in the web between the transverse bars 42.

The web and its tags are thus moved upwardly along the inclined flight 46 toward a selector assembly 60, which comprises a rotating star wheel 61 having an array of vacuum cups 65 disposed about its periphery. Hub 63 is secured on shaft 62 that is driven by a drive motor 64 to rotate the star wheel 61 in the indicated direction and in synchronization with a moving web below, meaning that the vacuum cups 65 rotate downwardly toward the web and move between successive pairs of transverse bars 42. In doing so, each vacuum cup engages a tag T of a web W and pushes the tag downwardly to punch it out and detach or free it from the web. A temporary vacuum applied to the vacuum cups stabilizes each tag as it is punched out of the web, thus insuring clean and reliable removal of tags from their web. The function of the selector assembly 60 is described in more detail below.

A web W is threaded by a machine operator into its ready or queued position by pulling the free end of the web, for example, from reel 17b, between rolls 23 and 24, across lower guide rail 26 and beneath roller assembly 30 as assembly 30 is in its raised or "idle" position. The web W is then moved up and placed on pins 33 through holes 17, whereupon air cylinder 35 is energized moving bars 37 toward the rollers on either side of the pins 33, thereby pinching and capturing the web. The web is now in its queued position ready to be loaded automatically onto the conveyor. At the appropriate time, such as when the machine detects that the other web is exhausted, the machine moves the roller assembly from its idle position toward the conveyor flight below. As assembly 30 is moved downwardly, the web W moves off of stationary pins 33, but is held in proper position between rollers 32 and bars 37. As the web engages the transverse bars of the conveyor assembly (detailed below), pins on the bars project through the holes of the web so that the web is properly loaded and ready for use. The air cylinder is then de-energized, freeing the web.

As mentioned, the in-feed assembly 10 includes the same components as discussed above for threading another web W from second or upper roll 11a to conveyor assembly 40 (FIGS. 3-7). This includes the upper guide roll 22, the upper guide rail 27, and upper roller assembly 38, which function in the same manner as the components discussed above with respect to roll 11b. As a web W is being drawn into the machine from reel 17b, the operator treads the web from reel 17a into its queued position as described above. When the web W is exhausted from reel 17b, the assembly 1 stops very briefly (one second for example), and the upper roller assembly 38 is lowered toward the bars of the conveyor, thus loading the fresh web for use. The second web W is then placed onto conveyor assembly 40, as discussed above. This process, therefore, provides exceedingly fast changeover from reel to reel when one web is exhausted. The operator then reloads the spent reel with a loaded reel and treads its web into its queued position as web W is drawn from the operating reel to prepare the machine for its next web changeover.

Figure 10:
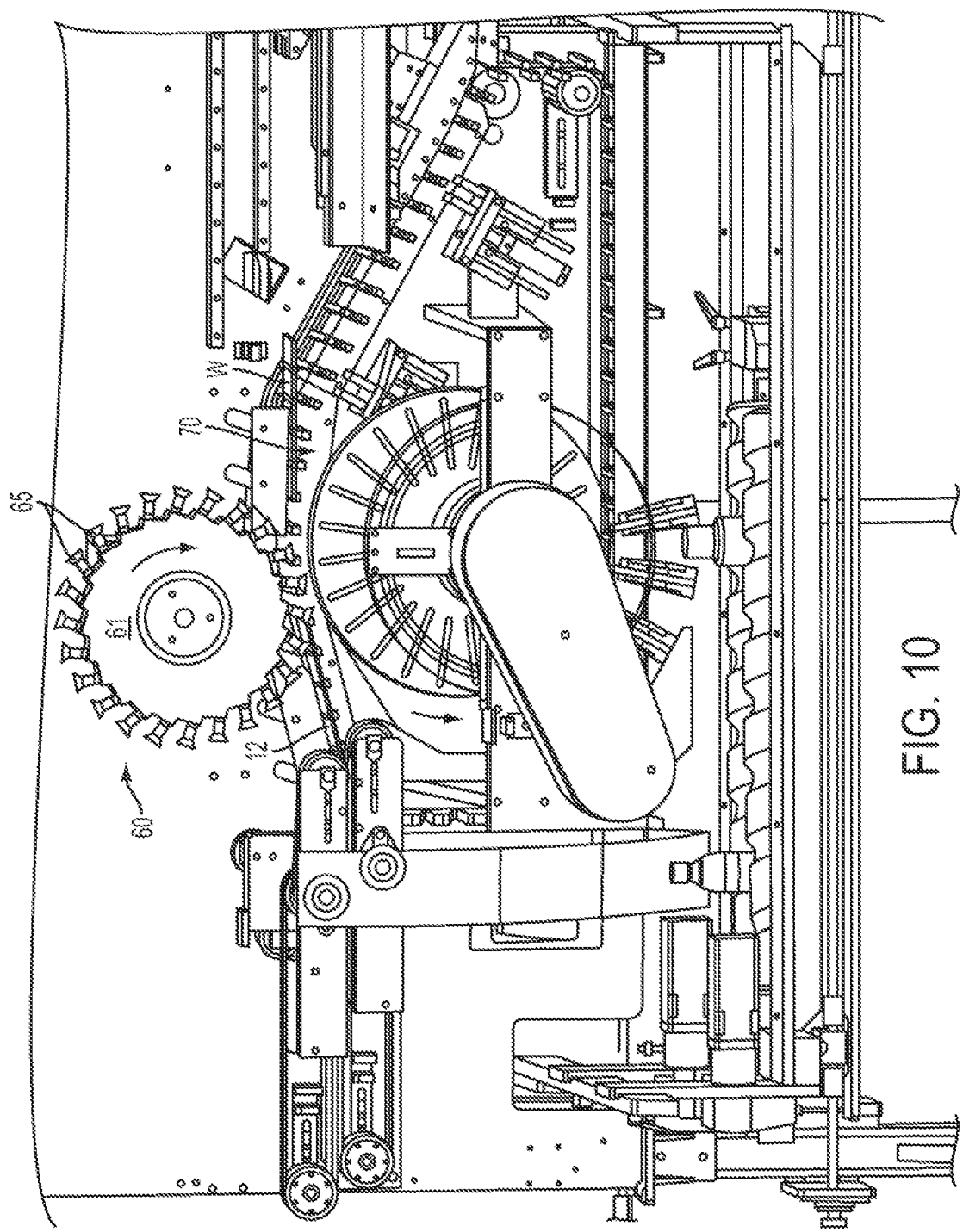
FIG. 10 is a side view of the article selection and placement assembly showing a portion of the web conveyor assembly, the selector assembly, the article placing assembly, and bottle conveyor.
Figure 11:
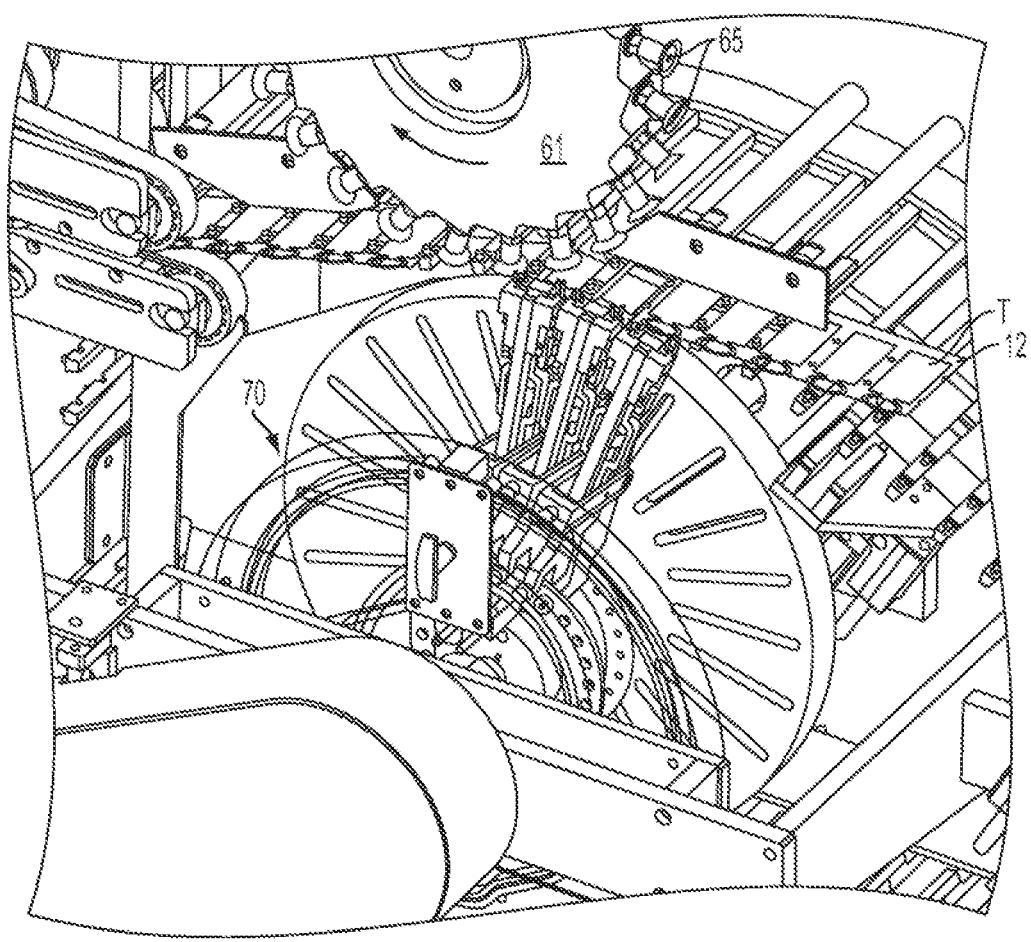
FIG. 11 is an enlarged perspective view of the selector assembly, and the article placing assembly and showing three exemplary jaw assemblies thereof.
Figure 12:
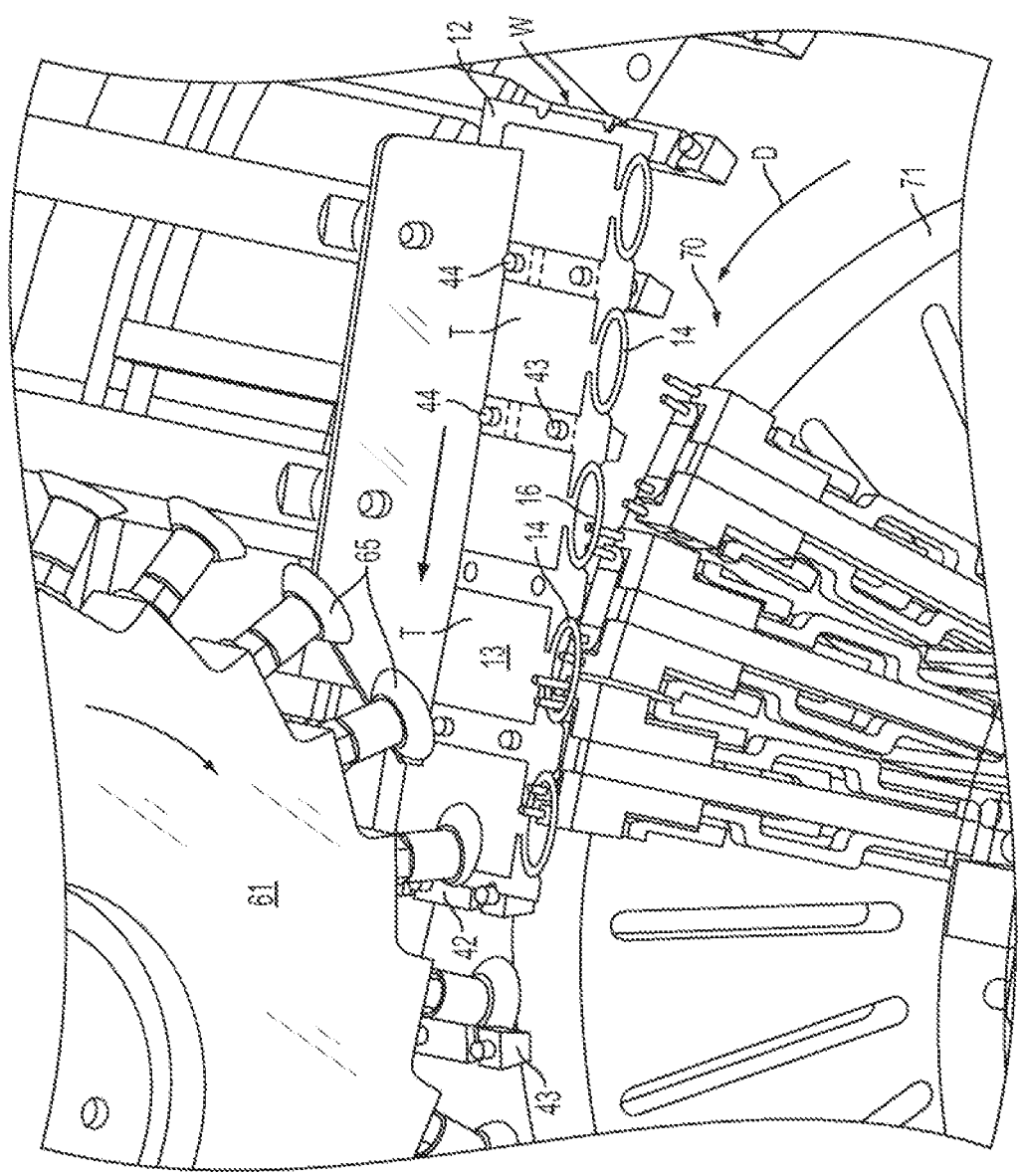
FIG. 12 is an enlarged perspective view illustrating removal of tags from their web and placement of the elastic anchor bands of the tags over the pins of corresponding jaw assemblies.

Referring to FIGS. 9-12, the star wheel 61 of the selector assembly 60 supports, in the illustrated embodiment, twenty-four vacuum cups 65 spaced equidistant from one another around its periphery. Star wheel 61 is formed with channels and hoses (not shown) that lead to cups 65 so that vacuum can be applied selectively to a cup via a vacuum manifold (not shown). The star wheel 61 is positioned directly over the web W so that a vacuum cup 65 rotates downwardly and contacts the body portion 13 of a tag T as the web is moved in the direction of arrow B. This contact of a cup 65 as it is rotated in an angular direction against tag T mechanically pushes tag T downwardly and from one edge of the tag to its other edge to punch the tag out of web W and away from substrate 12 by tearing the body 13 along tear line 15. The process is facilitated by the transverse bars 42, whose edges lie beneath and along the tear lines 15 that define the tags in the web and thus forming an anvil against which pressure is applied by the vacuum cups. Therefore, selector assembly 60 removes the tags T, continuously and sequentially, from substrate 12. When a vacuum cup moves into contact with a tag T, vacuum is applied momentarily through that cup 65 to the selected tag T in order to stabilize the selected tag as it is detached and moved downwardly away from substrate 12. The vacuum is thereafter released to allow the selected tag T to drop from the vacuum cup. FIGS. 10-12 illustrate the location of the selector assembly 60 in relation to the article placing assembly 70, described in detail below, which is disposed substantially directly beneath the selector assembly 60.

FIGS. 13 through 26 illustrates the configuration and function of article placing assembly 70, which is positioned below selector assembly 60, and these figures will be referred to as a group in the discussion that follows. Generally, as tags T are successively punched out of and detached from web W by the selector assembly 60, they are each picked by components of the article placing assembly 70, and placed onto bottles B passing beneath assembly 70. The placing assembly 70 includes two spaced wheels or discs. Wheel 71 is oriented vertically and rotates on shaft 73 in the direction of arrow C. Wheel 71 includes, in the illustrated embodiment, twenty-four equally spaced, radially extending slots 72. Slots 72 are sized to receive a cam follower, as discussed below, and are elongate, extending radially toward the periphery of wheel 71. Shaft 73 is driven by a drive motor (not shown). A cam disc 75 is spaced from wheel 71, and also is vertically oriented. Cam disc 75 does not rotate, but is stationary. Shaft 76, which is offset in the downward direction from shaft 73, extends through a central opening 77 in cam disc 75. A drive motor (not shown) drives shaft 76 in the direction of arrow C. A hub 78 is mounted to the inner or distal end of shaft 76 as perhaps best illustrated in FIG. 14. Hub 77 includes flanges 78 and 79, which define corresponding peripherally arrayed holes 80. The rotation of shaft 76 correspondingly rotates hub 77, with hub 77 and wheel 71 being rotated together, at the same rotational rate, and about vertically offset axes. Cam disc 75 defines, along its inner surface, two spaced cam tracks 85 and 86, with each track being in a loop. Track 85 is the inner cam track and track 86 is the outer cam track.

Figure 15:
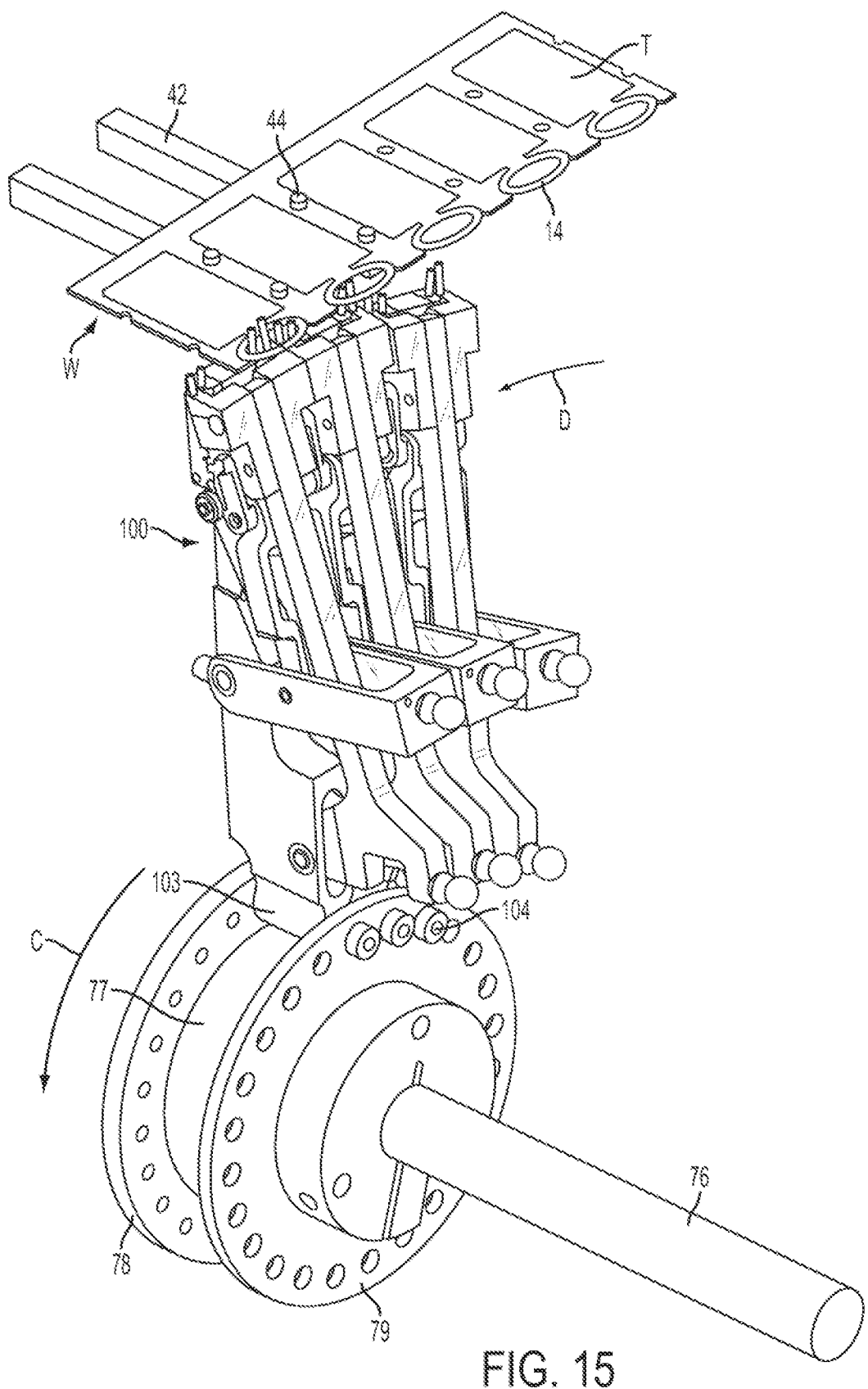
FIG. 15 is an enlarged perspective view of the wheel and three exemplary jaw assemblies of the article placement assembly.
Figure 16:
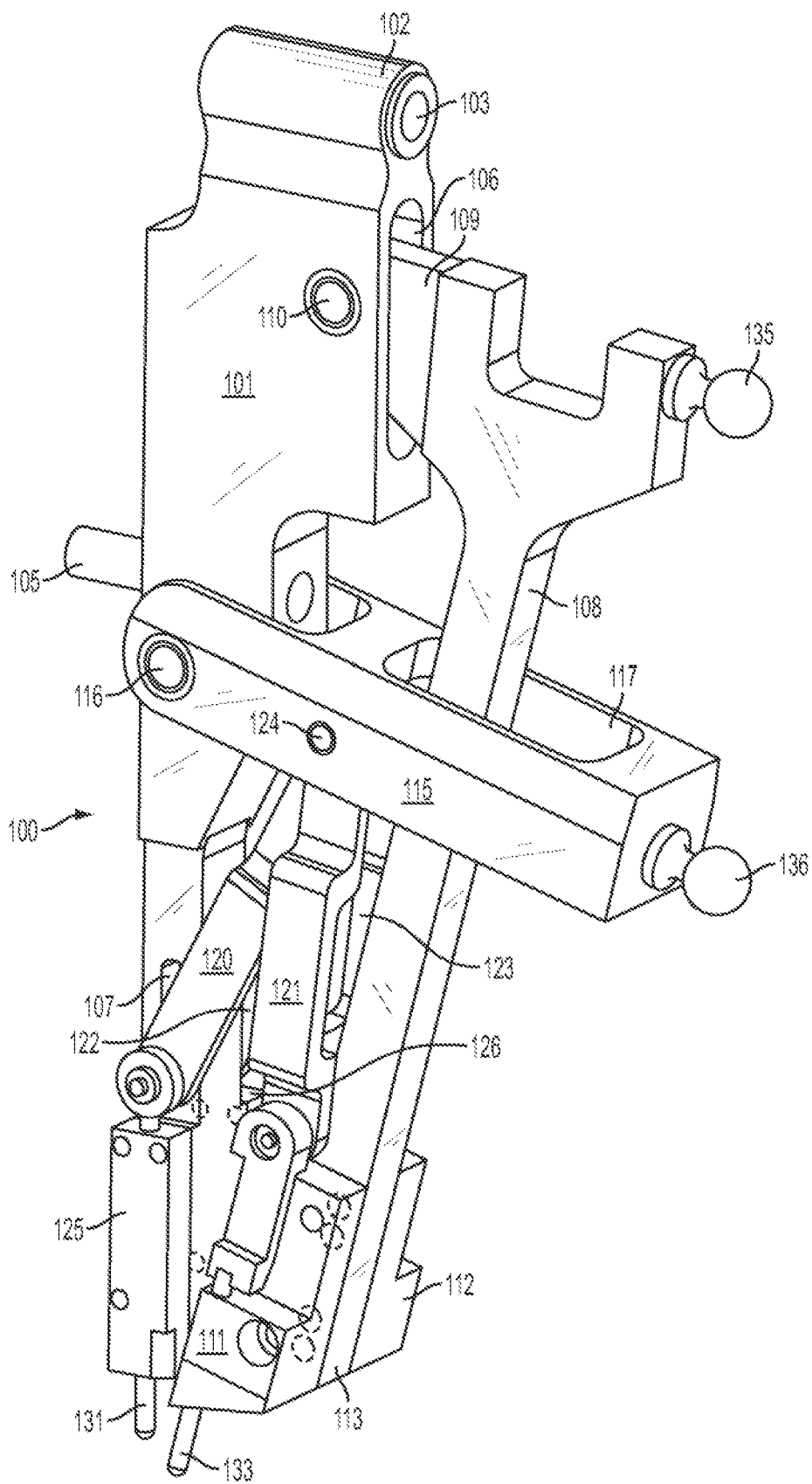
FIG. 16 is a perspective view of a jaw assembly in a substantially closed, pin-extended configuration assumed when receiving an elastic anchor band of a tag.
Figure 17:
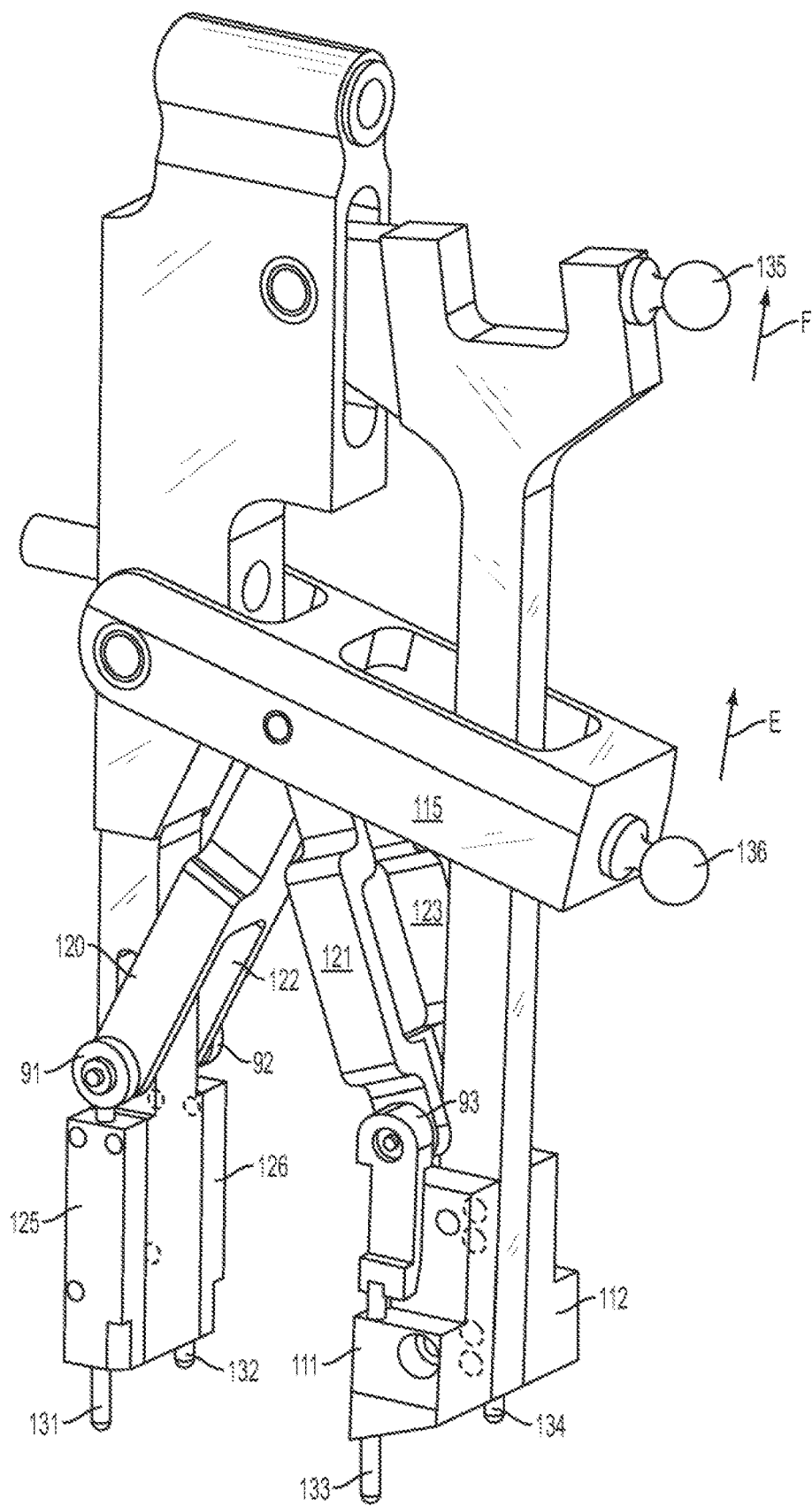
FIG. 17 is a perspective view of a jaw assembly in its open, pin-extended configuration assumed when placing the elastic anchor band of a tag over, for instance, a bottle top.

Jaw assemblies 100 are mounted to hub 77 radially around the hub in side-by-side arrangement as shown in FIG. 15. Twenty-four jaw assemblies 100 are mounted to hub 77 (although only three are illustrated in the figures for clarity), and are rotated therewith in the direction of arrow C. FIG. 16 shows one of the jaw assemblies 100, with each jaw assembly being constructed identically. Each jaw assembly 100 includes body 101 that defines mounting socket 102 on a proximal end. Socket 102 defines channel 103 therethrough, and is sized to be received between flanges 78 and 79 of hub 77 (FIG. 15). A pin 104 extends through channel 103 to hold assembly 100 between flanges 78 and 79. The proximal end of each jaw assembly 100 is thus carried around by rotation of the hub 77 in direction C. Jaw body 101 includes cam follower 105 projecting from one side. A slot 106 is defined at one end of body 101 adjacent to socket 102, and a slot 107 is defined at the opposite end of body 101 (FIG. 16). A pivoting jaw 108 is generally T-shaped, with a flange 109 that is received in slot 106. A pin 110 passes through flange 109, so that jaw 108 can pivot on pin 110 toward and away from body 101. A cam follower 135 is mounted to the pivoting jaw 108 and pivoting movement of the jaw 108 about pin 110 causes the distal end of the jaw 108 to move from a closed position as shown in FIG. 16 away from body 101 to the open position as shown in FIG. 17. Thus, pivoting movement of the jaw 108 opens and closes the jaw assembly 100. Mounting blocks 111 and 112 are mounted to the distal end portion 113 of jaw 108.

A yoke-shaped arm 115 is pivoted at one end to jaw body 101 by pin 116 and has a cam follower 136 mounted to its distal end. Arm 115 defines slot 117, though which jaw 108 passes and within which jaw 108 is free to move (FIG. 16). Retraction links 120-122, 121-123 (120-122 being a single component and 121-123 being a single component) are connected to arm 115 by pin 124, as shown in FIG. 16, so that each link is moved toward and away from socket 102 upon the pivoting of arm 115 toward or away from socket 102 on pin 116. Blocks 125 and 126 are mounted to the end portion of body 101. As shown in FIG. 17, pins 131 and 132 slidably extend through blocks 125 and 126 respectively and are connected through pivoting linkages 91 and 92 to the distal end of retraction link 120-122. Similarly, pins 133 and 134 slidably extend through blocks 111 and 112 and are connected through pivoting linkages 93 and 94 to the distal end of retraction link 121-123 respectively. It will thus be seen that pivoting motion of arm 115 in direction E in FIG. 17 pulls the retraction lengths 120-122 and 121-123 in the same direction. This, in turn, through pivoting linkages 91, 92, 93, and 94, pulls the pins 131, 132, 133, and 134 causing them to retract within their respective blocks 125, 126, 111, and 112. Alternatively, movement of arm 115 in the direction opposite to direction E in FIG. 17 causes the pins 131, 132, 133, and 134 to extend from the ends of blocks 125, 126, 111, and 112 as shown in FIG. 17. Thus, pivoting motion of the arm 115 extends and retracts the pins 131, 132, 133, and 134.

Figure 18:
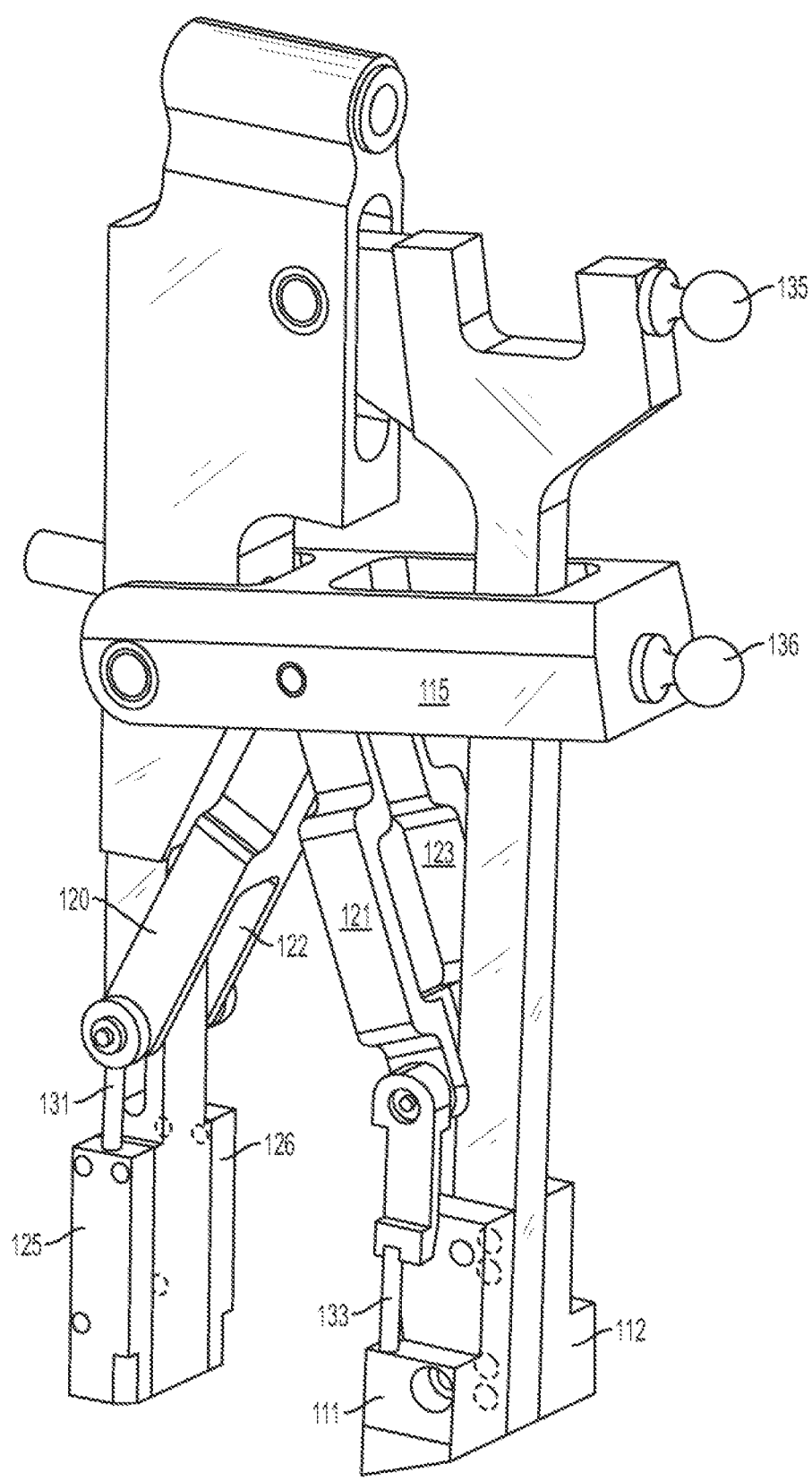
FIG. 18 is a perspective view of a jaw assembly in its open, pin-retracted configuration assumed when releasing the elastic anchor band of a tag onto, for instance, a bottle top.

FIG. 16 shows the assembly 100 with the jaws in a substantially closed position, that is, moved closely together, and with the pins extended from their respective blocks. FIG. 17 shows the jaws in a substantially opened position with extended pins 131 and 132 moved away from extended pins 133 and 134, respectively, and with the pins extended outwardly away from socket 102. FIG. 18 shows the jaw in a substantially opened configuration, but with the pins fully retracted into their respective blocks; that is, moved toward socket 102. Motion of cam followers 135 and 136, therefore, progressively opens and closes the jaw assembly, as desired, and also extends and retracts the pins, as desired.

Figure 13:
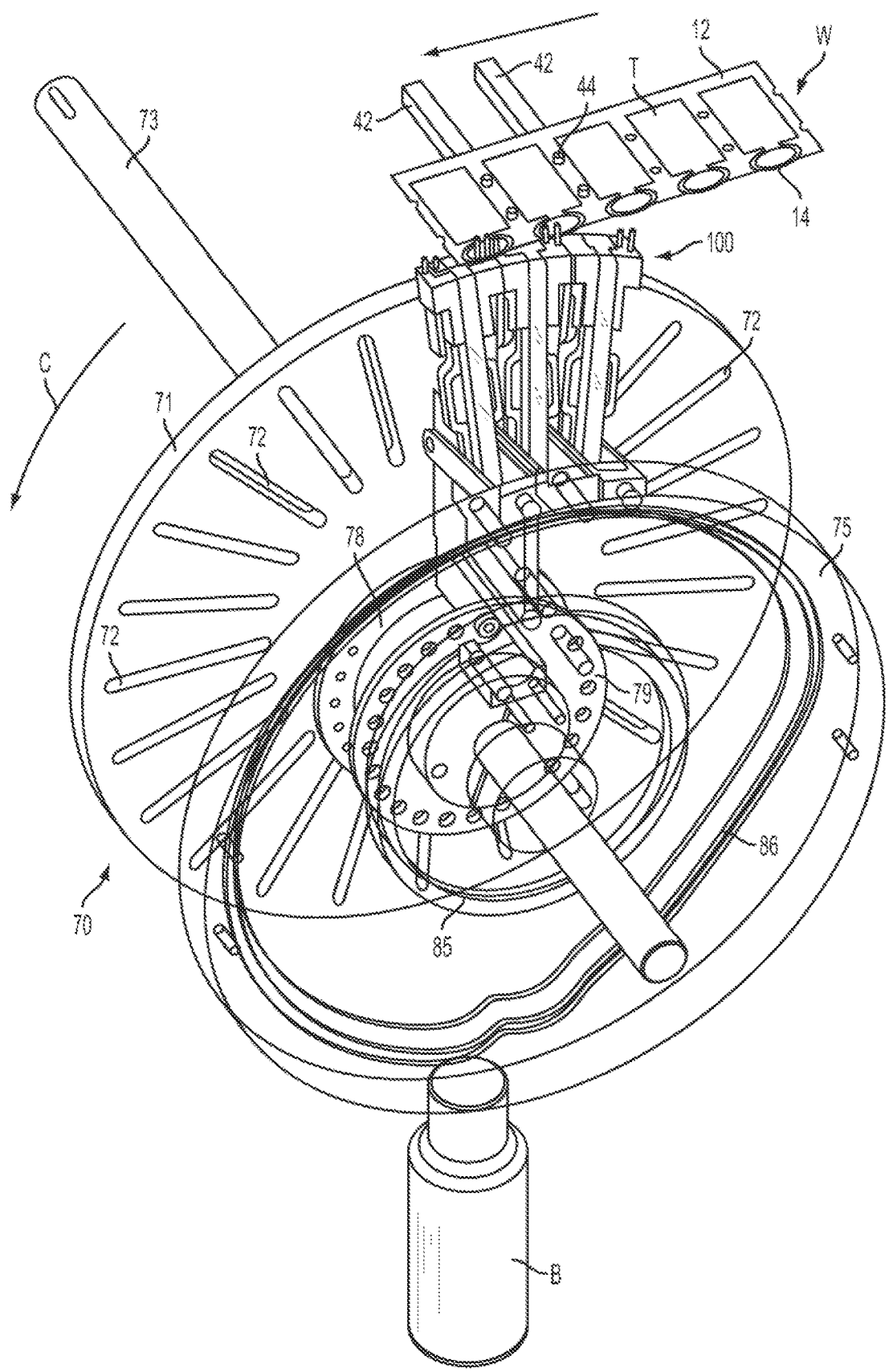
FIG. 13 is a perspective partially transparent view of the article placement assembly illustrating the offset cam disc and its dual cam tracks for controlling the jaw assemblies.
Figure 14:
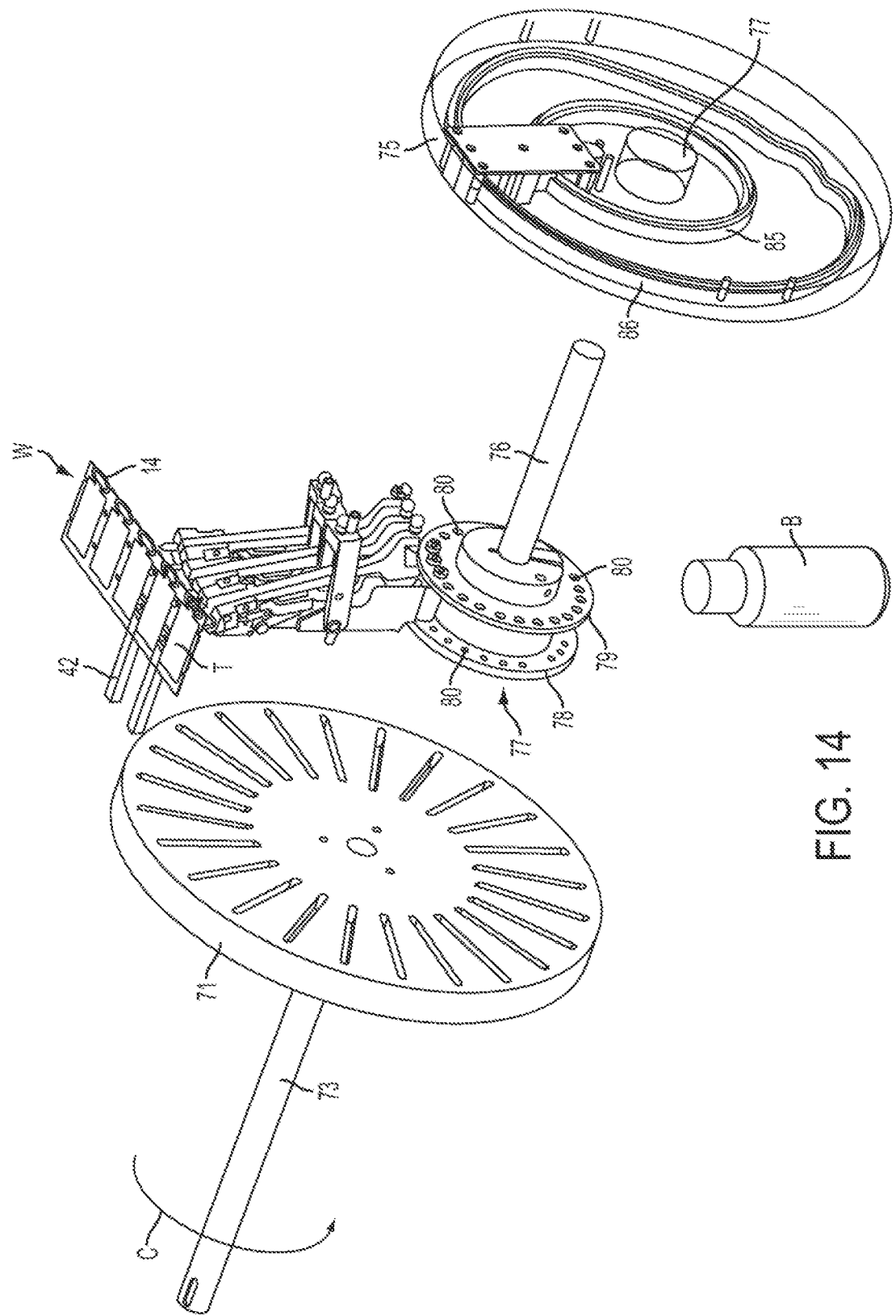
FIG. 14 is an exploded perspective view of the article placement assembly of FIG. 13 illustrating attachment of the jaw assemblies to the wheel of the article placement assembly.

Referring to FIG. 13, three of the just described jaw assemblies are shown connected to the flanges 78 and 79 of hub 77 extending radially outwardly therefrom. It will be understood that a full complement of jaw assemblies are in fact present, but three are shown here for clarity. The jaw assemblies 100 extend outwardly with their bodies 101 located adjacent to wheel 71. The spacing cam follower 105 (FIG. 16) of each jaw assembly extends from the body of the assembly slidably through a corresponding one of the radially extending slots 72 in wheel 71. The wheel 71 and the hub 77 are rotated at the same rate and the jaw assemblies are thus rotated from upper positions with their ends adjacent a web above and a lower position with their ends adjacent bottles below. Since the axis of the hub 77 is downwardly offset from the axis of wheel 71, the jaw assemblies are caused to spread apart progressively as they move toward their lower positions and draw together as they move toward their upper positions. This is because the radial slots 72 of wheel 71 are farther apart at their distal ends than at their proximal ends and, due to the described offset, the spacing cam followers 105 are positioned near the distal ends of the slots at the lower positions of their respective jaw assemblies and near the proximal ends of the slots at the upper positions of their respective jaw assemblies. It may thus be said that the ends of the jaw assemblies spread progressively apart as the jaw assemblies rotate down and bunch progressively together as the jaw assemblies rotate up.

Cam disc 75 is disposed on the opposite side of the jaw assemblies as best seen in FIG. 13, where the cam disc is shown transparent for clarity. Cam disc 75 is formed on its surface adjacent the jaw assemblies with two cam tracks, an inner cam track 85 and an outer cam track 86. The cam followers 135 and 136 of the jaw assemblies (FIG. 16) ride in respective cam tracks 85 and 86. Specifically, cam follower 135, which controls the opening and closing of the jaw assembly, rides in the inner cam track 85 and cam follower 136, which controls the extension and retraction of the pins of the jaw assemblies, rides in outer cam track 86. The cam tracks are shaped so that the jaw assemblies are substantially closed with their pins extended as they rotate to their upper positions. As each jaw assembly begins to rotate downwardly toward its lower position and bottles below, the inner cam track acting on the cam follower 135 causes the pivoting jaw 108 to pivot away from the body 101 of the jaw assembly, thus opening the jaw assembly and moving extended pins 131 and 132 away from extended pins 133 and 134 (FIG. 17). In other words, the jaw assembly opens as it rotates downwardly toward the bottom of its path and, at the same time, its ends spread apart from the ends of adjacent jaw assemblies as described above.

At the bottom portion of the path, the adjacent ends and adjacent pins of a pair of adjacent open jaw assemblies intercept and straddle the top of a corresponding bottle B, which is being moved by timing screw 6 in synchronization with the rotating jaw assemblies. When these pins have straddled the top of the bottle B, the outer cam track 86 acting on cam followers 136 causes the pins of the adjacent open jaw assemblies to retract into their respective blocks for purposes described in detail below. The lengths of the pins on each jaw assembly are different and are predetermined so that adjacent pins on adjacent ends of each pair of adjacent open jaw assemblies reach their fully retracted positions at approximately the same instant. Each jaw assembly then rotates back up toward the top of its path and, during this phase, the cam tracks 85 and 86 act on the cam followers 135 and 136 to cause the jaw assemblies to close and to cause their pins to extend in preparation for a next successive cycle. At the same time, the ends of the jaw assemblies are progressively bunched together by action of the radial slots 72 of wheel 71 acting on the spacing cam followers 105 of the jaw assemblies.

The operation of the placing assembly will now be described in more detail with reference to the group of FIGS. 12 through 26. Referring to FIG. 12, as wheel 71 and hub 77 are rotated together in the direction of arrow D, jaw assemblies 100 are moved in the direction of arrow D toward the twelve o'clock position of their path. The action of cam follower 136 in outer cam track 86 extends pins 131, 132, 133 and 134 of each jaw assembly fully outwardly, toward a web W moving in synchronization on the transverse arms 43 of the conveyor assembly 40. At about the 12 o'clock position, the directly adjacent pins of two adjacent jaw assemblies align with and extend progressively through an opening 16 of an elastic anchor band 14 of a corresponding tag T. At this point, a vacuum cup 25 of the article selector assembly 60 pushes down on and separates or punches out the tag T from the web W, a vacuum applied to the cup gripping and stabilizing the tag until it is fully separated from the web. When the vacuum is released from cup 25, the tag is released to be caught and held on the four pins of the adjacent jaw assemblies 100 by its elastic anchor band 14. The action of the pins moving through elastic anchors of synchronously moving tags T is perhaps best illustrated in FIG. 15 and also can be seen in FIG. 19 from the back side of the wheel 71.

As the wheel 71 and jaw assemblies continue to rotate downwardly in the direction of arrow D toward the 6 o'clock position of their path, the action of the inner cam track 85 on the cam follower 135 causes each jaw assembly to open progressively so that its pins 131 and 132 move away from pins 133 and 134; i.e., the pin sets of each jaw assembly spread apart. At the same time, the ends of the jaw assemblies also progressively spread apart through action of the spacing cam followers 105 sliding toward the distal ends of slots 72 in wheel 71. The action of the pin set moving away from one another in conjunction with the spreading apart of the ends of adjacent jaw assemblies causes the elastic anchor bands 14 of each tag to be stretched wide by the pins by the expanding pins of adjacent jaw assemblies as the wheel 71 and jaw assemblies continue to move toward the six o'clock position and toward the bottles B below.

Figure 21:
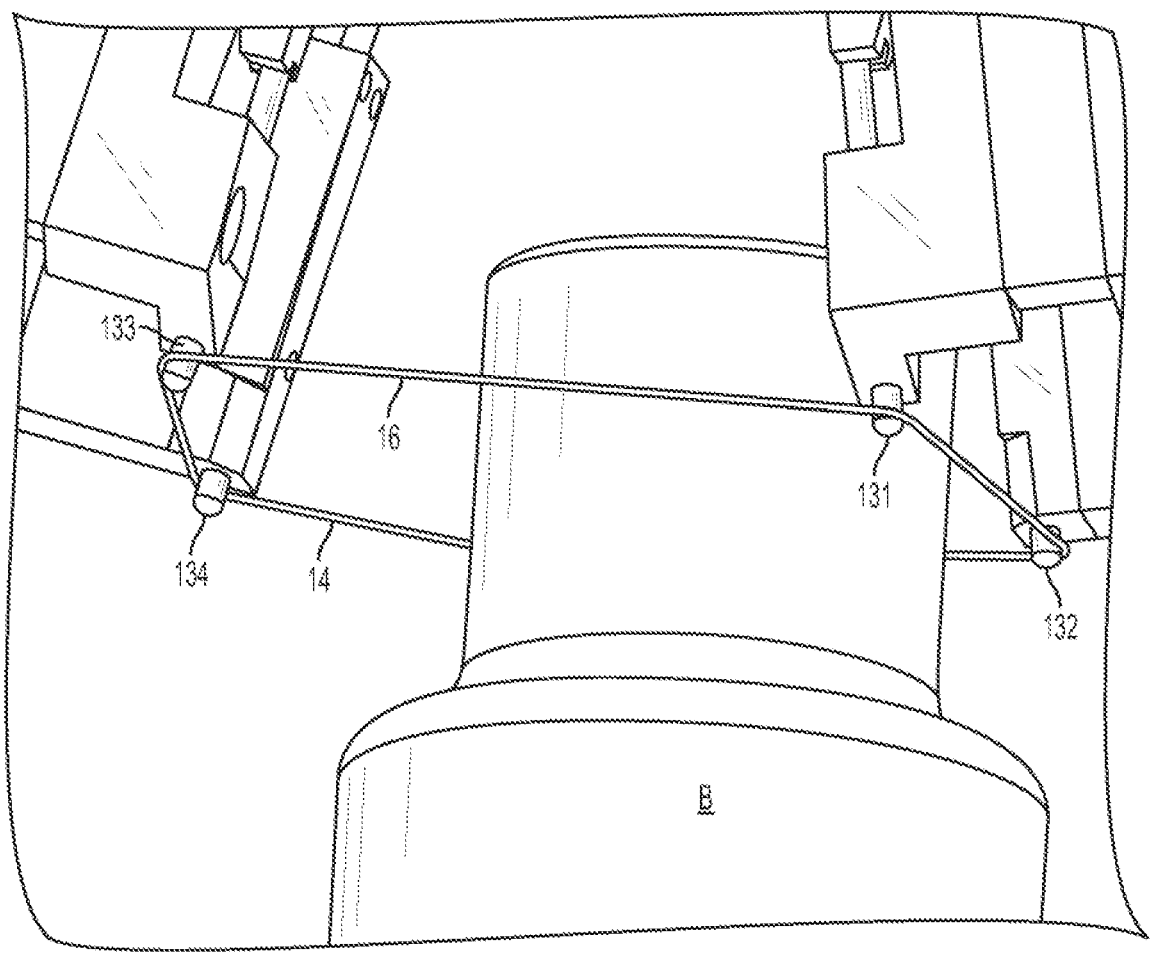
FIG. 21 is an enlarged perspective view of the distal end portions of a jaw assembly illustrating positioning of an elastic anchor band of a tag around, for instance, a bottle top.

The bottles are moved consecutively and synchronously beneath assembly 70 by timing screw 6, as is known in the art. The rotation of the wheel 71 and hub 77 is timed with the bottle line speed and pitch so that the adjacent pins of adjacent jaw assemblies 100 register or aligns with one bottle B at approximately the six o'clock position of the wheel 71, or substantially directly beneath assembly 70, as perhaps best illustrated in FIG. 22. At the same time, as shown in FIG. 21, the spread apart adjacent ends and extended pins carrying the stretched-out anchor band of the tag move over and straddle the top portion of the bottle B. The stretched-out anchor band 14 thus is positioned to surround the top portion of the bottle B. In this position, the outer cam track 86 acting on the cam follower 136 causes the retraction links 120, 121, 122, and 123 to retract the adjacent pins of adjacent jaw assemblies into their corresponding blocks and away from the bottle B. Because of the predetermined varying lengths of adjacent pins on adjacent jaw assemblies, all four pins around which an anchor band is stretched reach their fully retracted positions at approximately the same instant. When this occurs, the elastic anchor band 14 of tag T is released from the pins, and snaps onto the neck or top portion of a bottle. The tag is thus attached to the bottle by its elastic anchor band for displaying advertising, contest information, or other indicia as desired. Each jaw assembly then rotates back up, is closed, its ends bunch toward the ends of adjacent jaw assemblies, and its pins extend in preparation for the next succeeding cycle.

Figure 20:
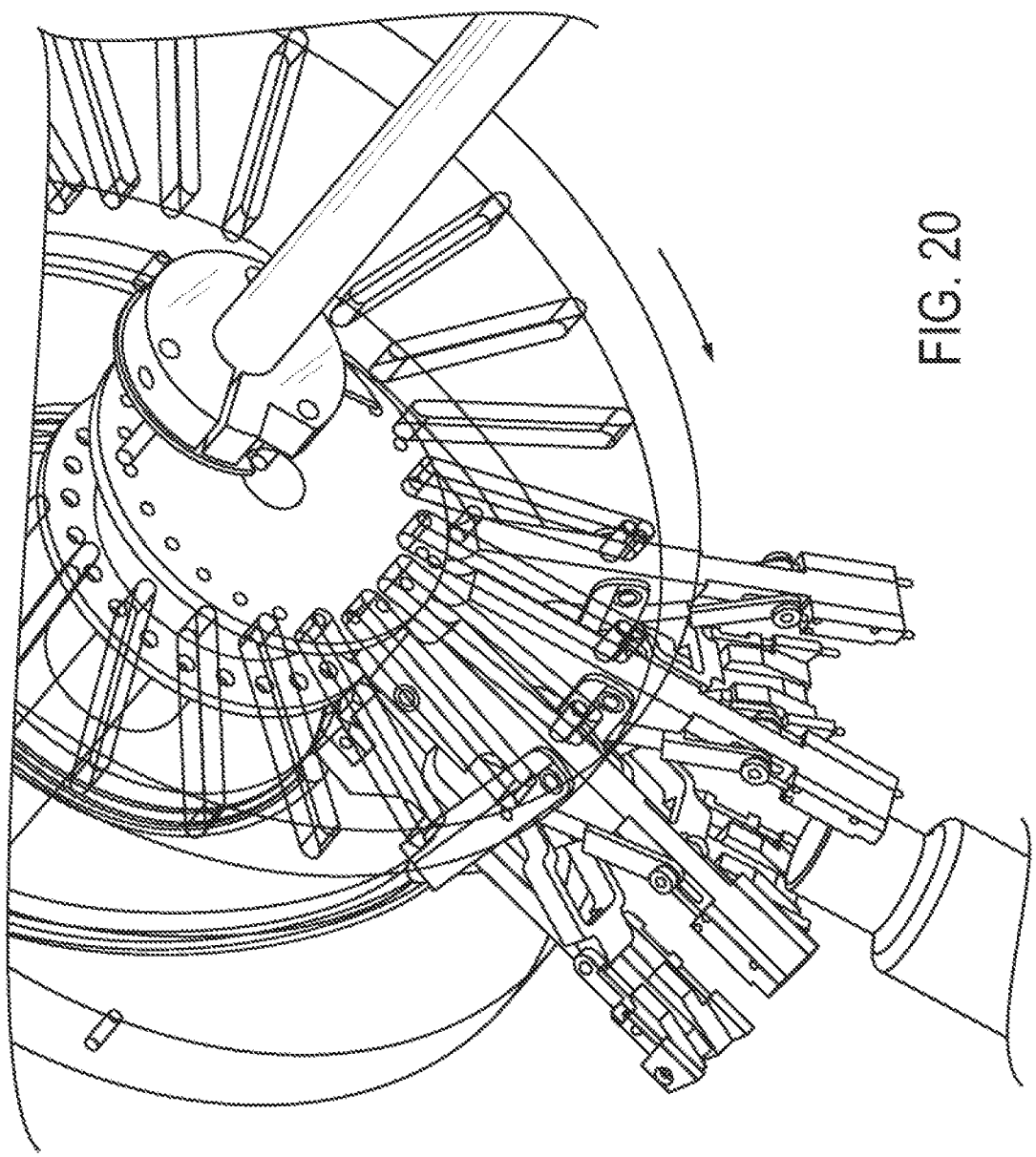
FIG. 20 is a perspective partially transparent view of the article placement assembly illustrating retraction of the pins to place tags on, for instance, bottle tops.
Figure 22:
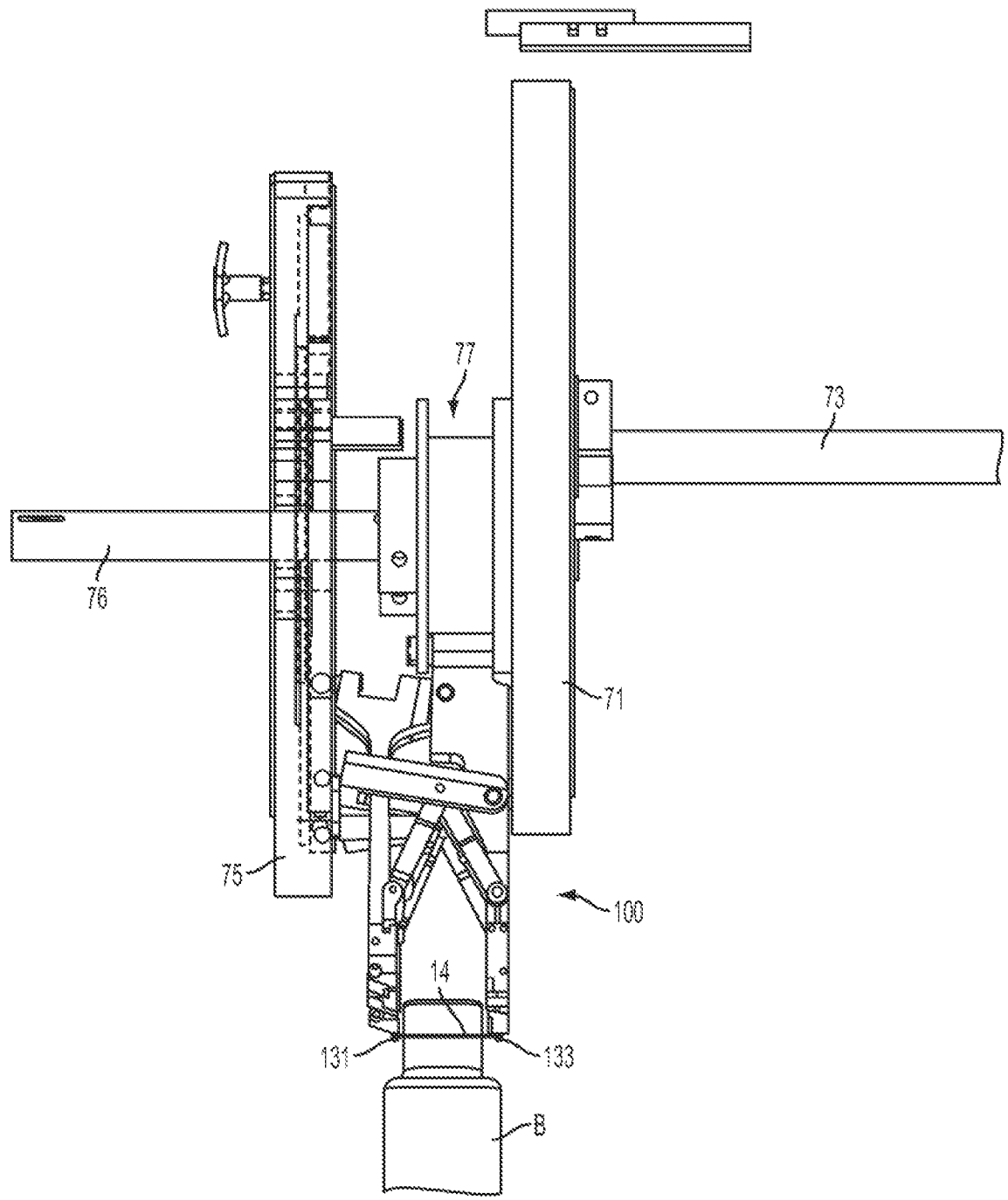
FIG. 22 is a front view of the article placement assembly showing a jaw assembly thereof positioning an elastic anchor band of a tag around, for instance, a bottle top.
Figure 23:
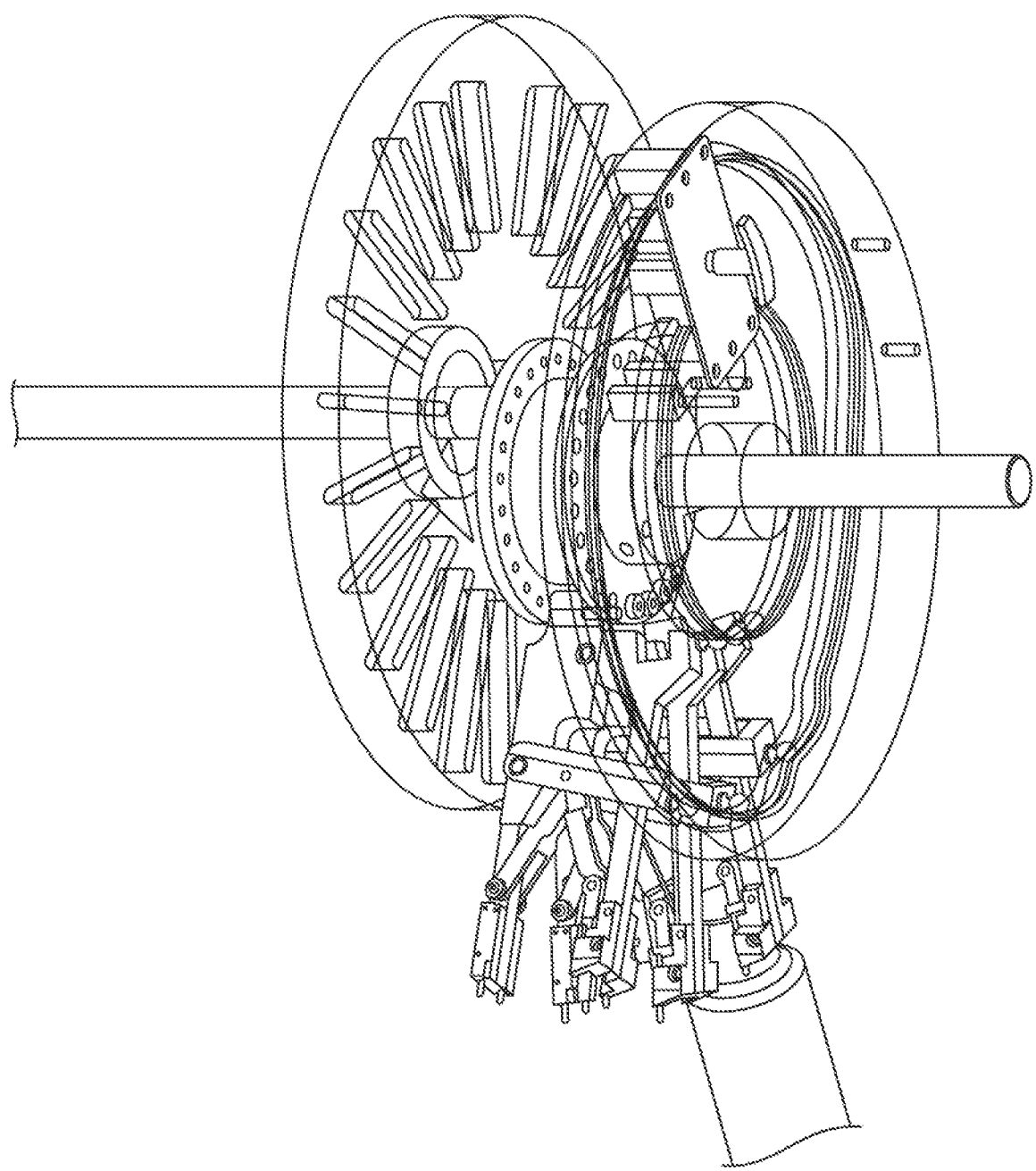
FIG. 23 is a perspective partially transparent view of the article placement assembly of FIGS. 21 and 22.
Figure 24:
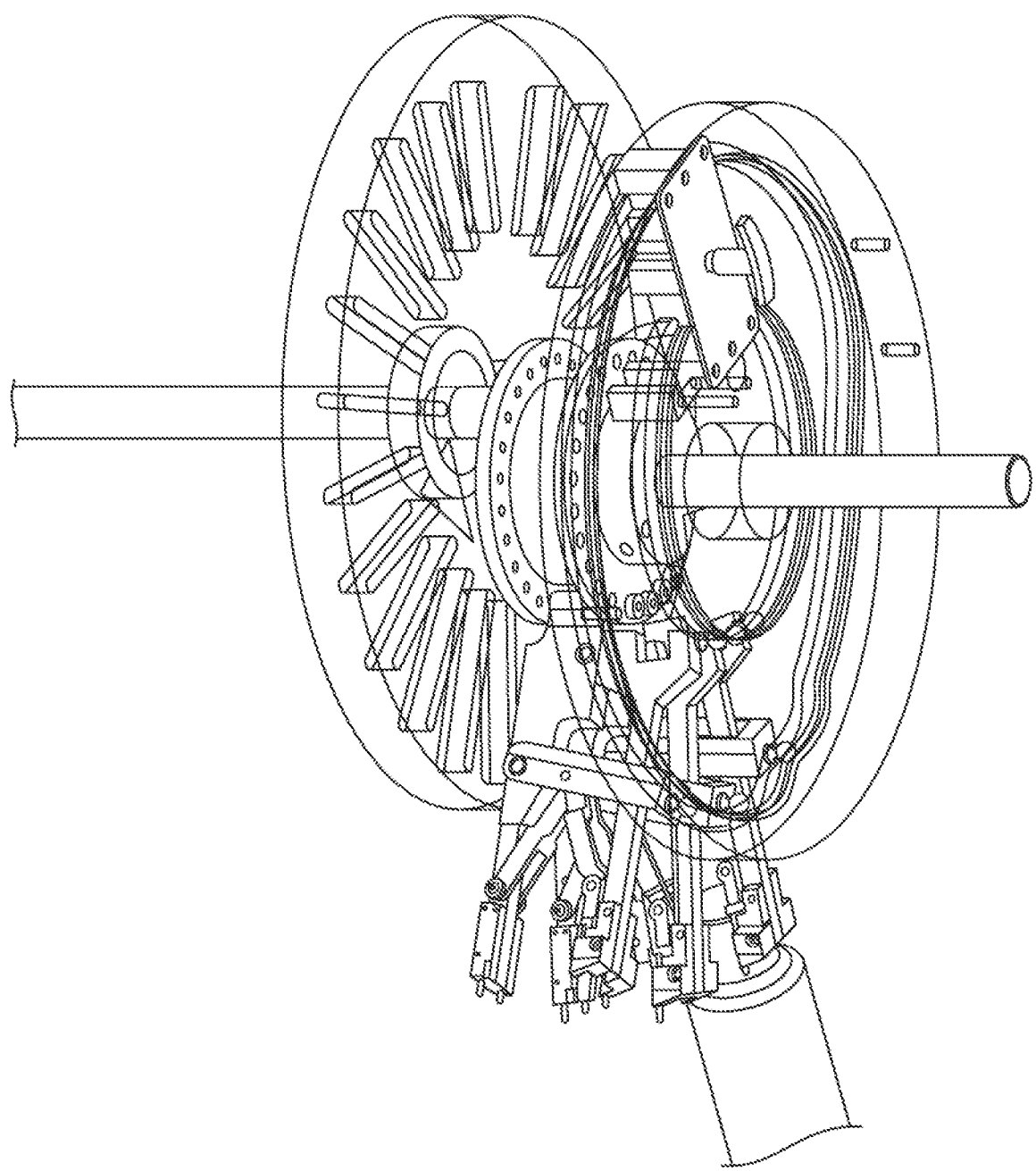
FIG. 24 also is a perspective partially transparent view of the article placement assembly.
Figure 25:
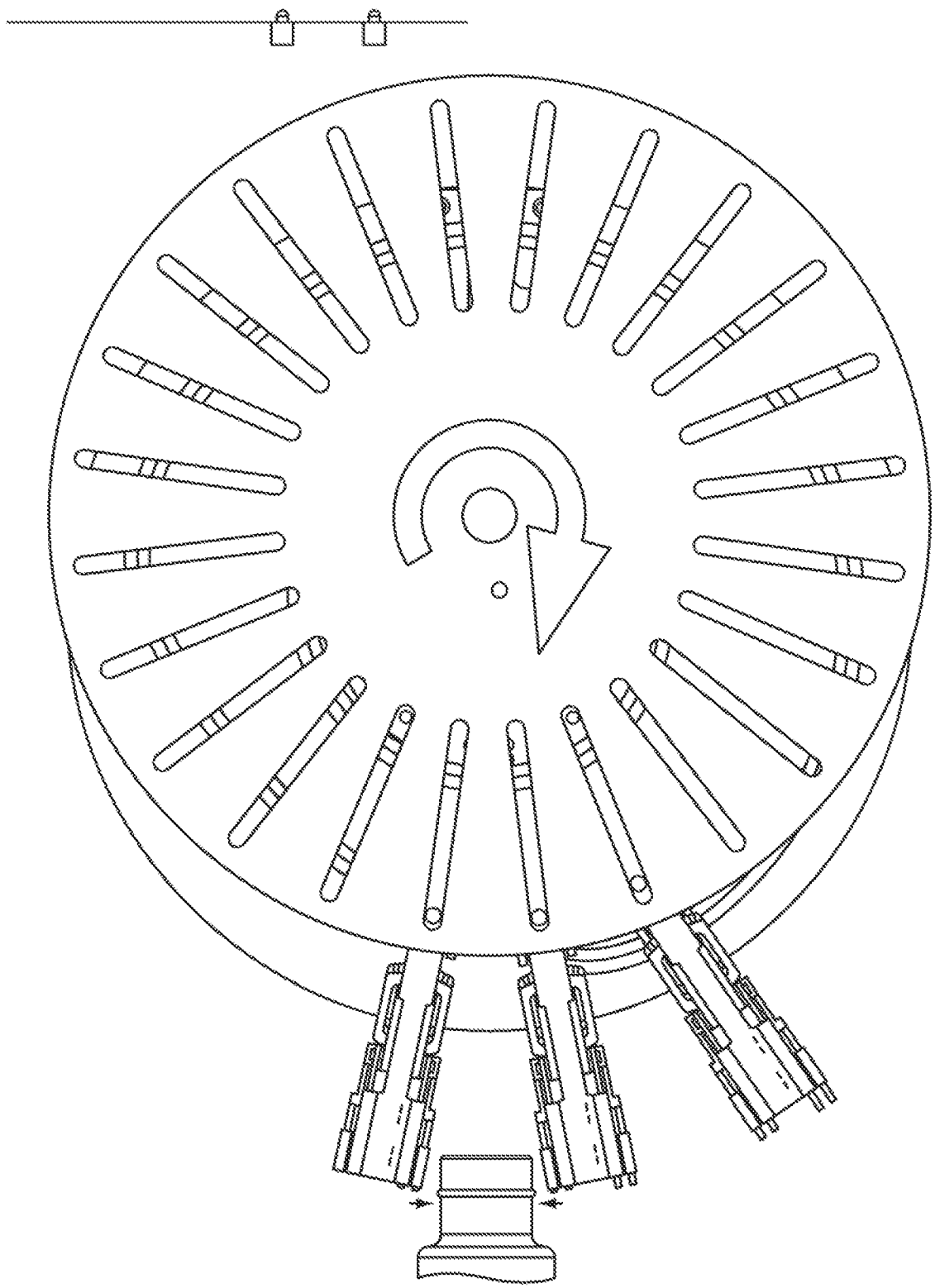
FIG. 25 is a side view of the article placement assembly showing jaw assemblies carrying tags rotating downwardly to place the tags on, for instance, bottle tops.
Figure 26:
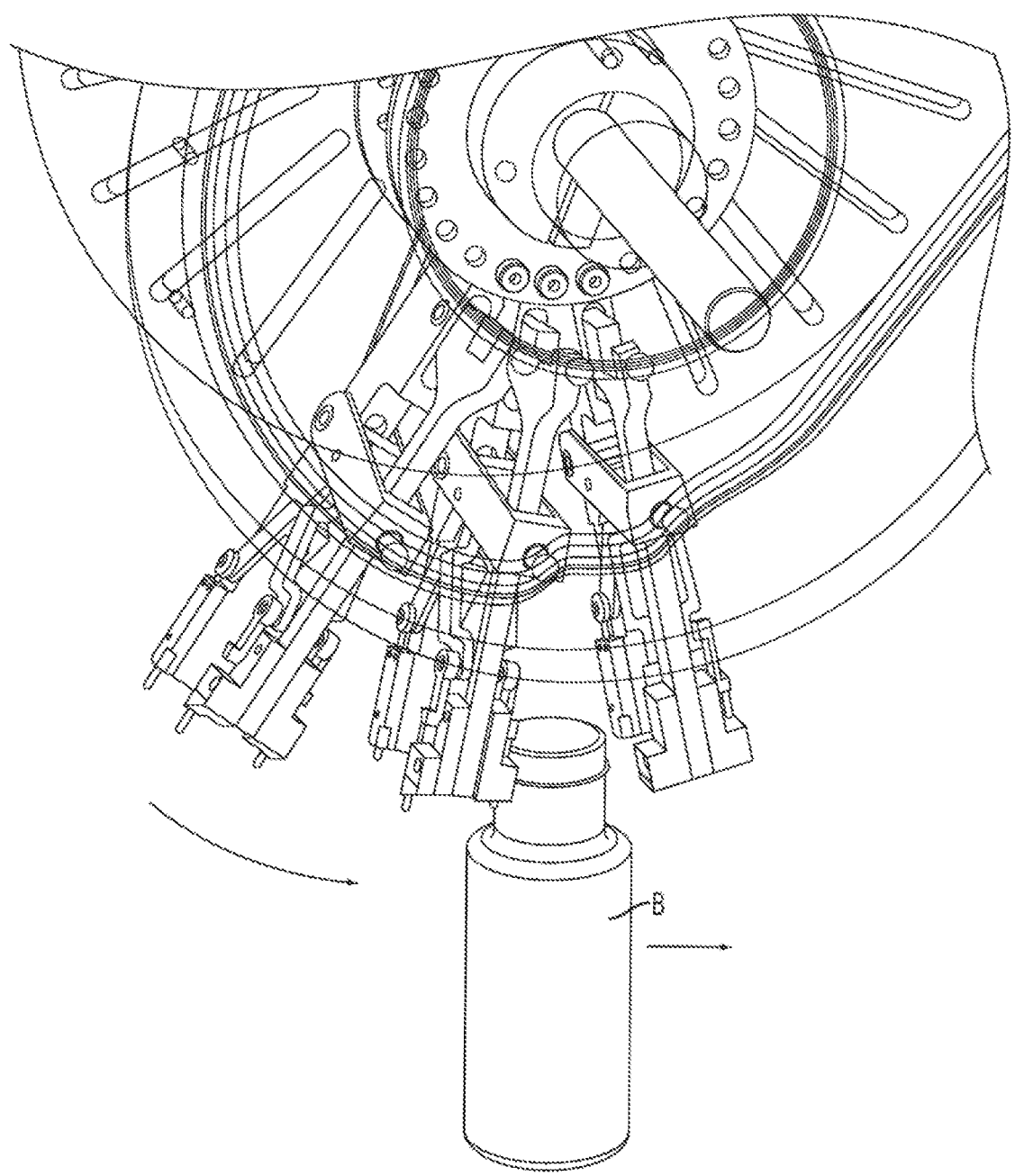
FIG. 26 is a perspective partially transparent view of the article placement assembly in the same configuration as shown in FIG. 25.

FIG. 20 depicts a jaw assemblies 100 and bottle B approaching one another. FIG. 21 depicts the four adjacent pins of adjacent jaw assemblies holding a tag T through opening 16 of elastic anchor band 14, and positioning the band around a bottle neck, just prior to the pins being fully retracted. Since the pin lengths are predetermined so that adjacent pins of adjacent jaw assemblies reach their fully retracted positions at about the same instant, the anchor band 14 is released by all pins at the same time and snaps onto the bottle top reliably. FIG. 22 is an alternate view of an assembly 101 in the six o'clock position. FIGS. 23-26 show a jaw assembly 100 over a bottle B, with the position of the cam tracks illustrated. The continuous motion of the article selection and placement assembly of this disclosure provides the capacity to place elastic banded labels onto bottles or other objects at very high rates and to do so reliably and efficiently. The ability to quick-thread the machine with a fresh web of tags when one web expires reduces costly down time significantly.

The invention has been described herein in terms of preferred embodiments and methodologies considered by the inventor to represent the best mode of carrying out the invention. It will be understood by those of skill in the art, however, that a wide range of additions, deletions, and modifications might be made to the illustrated embodiments. For example, while the jaw assemblies of the preferred embodiment is articulated using cam tracks and cam followers, this function might be accomplished with servo motors controlled by programmed virtual cam tracks. In such a modification, the motion of the jaw assemblies can easily be modified as needed to accommodate different types of tags or bottles. These and other modifications, both subtle and gross, might well be made to the illustrated embodiments by the skilled artisan without departing from the spirit and scope of the invention, which is delimited only by the claims.

What is claimed is:

1. An apparatus comprising:
   a rotatable hub;
   an array of elongated members attached at one end to the rotatable hub, each elongated member having a cam follower projecting therefrom;
   a rotatable wheel disposed adjacent the rotatable hub and being axially offset with respect thereto; and
   an array of slots formed in the rotatable wheel and having distal ends adjacent the periphery of the wheel that are spaced further apart than opposite proximal ends of the slots;
   the cam follower of each elongated member extending slidably into a respective one of the slots;
   rotation of the hub and the wheel rotating the elongated members and moving the cam followers of each elongated member between proximal and distal ends of respective slots of the rotatable wheel to cause the elongated members to spread apart and bunch together as the elongated members are rotated by the hub.

2. The apparatus of claim 1 wherein the elongated members comprise a plurality of jaw assemblies that are positionable between a closed position and an open position.

3. The apparatus of claim 2, wherein the cam follower is a first cam follower projecting from a first side of a respective jaw assembly of the plurality of jaw assemblies, each of the jaw assemblies further comprise a second cam follower extending from a second side of the jaw assemblies, the second side being opposite the first side.

4. The apparatus of claim 3, further comprising a cam disc located adjacent to the plurality of jaw assemblies and having a cam track formed therein, the second cam follower of a respective jaw assembly is moveable in the cam track to open and close the jaw assemblies as they rotate about the hub.

5. The apparatus of claim 4, wherein each jaw assembly further comprises a third cam follower extending from the second side of the jaw assemblies, the cam track of the cam disc is a first cam track for receiving the second cam follower, the cam disc comprises a second cam track for receiving the third cam follower.

6. The apparatus of claim 5, further comprising at least one pin on each jaw assembly having an extended position and a retracted position, the third cam follower is moveable in the second cam track to position the at least one pin between the retracted position and the extended position as the jaw assemblies rotate about the hub.

\* \* \* \* \*